United States Patent
Jaynes et al.

(10) Patent No.: US 11,428,773 B2
(45) Date of Patent: Aug. 30, 2022

(54) SYSTEMS AND METHODS TO DETERMINE ROOM OCCUPANCY

(71) Applicant: Mersive Technologies, Inc., Denver, CO (US)

(72) Inventors: Christopher Jaynes, Denver, CO (US); Kirk Roerig, Denver, CO (US); Vincent Ferreri, Frederick, CO (US)

(73) Assignee: Mersive Technologies, Inc., Denver, CO (US)

( * ) Notice: Subject to any disclaimer, the term of this patent is extended or adjusted under 35 U.S.C. 154(b) by 220 days.

(21) Appl. No.: 16/963,072

(22) PCT Filed: Jan. 17, 2019

(86) PCT No.: PCT/US2019/014081
§ 371 (c)(1),
(2) Date: Jul. 17, 2020

(87) PCT Pub. No.: WO2019/143861
PCT Pub. Date: Jul. 25, 2019

(65) Prior Publication Data
US 2020/0348388 A1 Nov. 5, 2020

Related U.S. Application Data

(60) Provisional application No. 62/618,244, filed on Jan. 17, 2018.

(51) Int. Cl.
*H04W 68/00* (2009.01)
*G01S 5/02* (2010.01)
(Continued)

(52) U.S. Cl.
CPC .......... *G01S 5/0252* (2013.01); *G06N 3/0481* (2013.01); *H04B 17/3913* (2015.01);
(Continued)

(58) Field of Classification Search
None
See application file for complete search history.

(56) References Cited

U.S. PATENT DOCUMENTS

2011/0105154 A1  5/2011  Kim
2011/0282509 A1  11/2011  Yegin et al.
(Continued)

FOREIGN PATENT DOCUMENTS

WO   WO 2016/083937 A1   6/2016
WO   WO 2016/099609 A1   6/2016

OTHER PUBLICATIONS

PCT/US2019/014081 International Search Report and Written Opinion dated Mar. 29, 2019, 22 pp.
(Continued)

*Primary Examiner* — Suhail Khan
(74) *Attorney, Agent, or Firm* — Lathrop GPM LLP

(57) ABSTRACT

Systems and methods determine occupancy of a mobile device in a room based on one or more wireless signals measured by the mobile device. The mobile device receives and processes one or more wireless signals detectable in the room to generate a feature vector that is inputted to a classifier. The wireless signals may originate either in the room or out of the room. The feature vector contains wireless-signal characteristics measured by the mobile device (e.g., time-averaged power, Fourier coefficients) that are essentially unique to a room. The classifier, which may be an artificial neural network, predicts the occupancy of the mobile device in the room from the feature vector. Alternatively, the location of the mobile device in the room may be verified, wherein the feature vector may form a training example to train the classifier.

32 Claims, 8 Drawing Sheets

(51) Int. Cl.
  *H04B 17/391*  (2015.01)
  *H04W 4/50*  (2018.01)
  *G06N 3/04*  (2006.01)
  *H04W 64/00*  (2009.01)

(52) U.S. Cl.
  CPC ............ *H04W 4/50* (2018.02); *H04W 64/00* (2013.01); *H04W 68/00* (2013.01)

(56) References Cited

U.S. PATENT DOCUMENTS

| | | |
|---|---|---|
| 2017/0055126 A1 | 2/2017 | O'Keefe |
| 2017/0061750 A1 | 3/2017 | Eyring et al. |
| 2017/0150318 A1 | 5/2017 | Mappus et al. |
| 2018/0184265 A1* | 6/2018 | Wan ..................... H04W 4/023 |

OTHER PUBLICATIONS

Thomas et al. (2016) "On the Optimal Node Ratio between Hidden Layers: A Probabilistic Study," International Journal of Machine Learning and Computing, vol. 6, No. 5, pp. 1-7.

* cited by examiner

SYSTEMS AND METHODS TO DETERMINE ROOM OCCUPANCY

CROSS-REFERENCE TO RELATED APPLICATION

This application claims priority to and benefits from U.S. Provisional Application Ser. No. 62/618,244, filed on Jan. 17, 2018, the entirety of which is incorporated by reference herein.

BACKGROUND

Occupancy sensors allow a system to make determinations of the occupancy of a room at a given time. Certain occupancy sensors are binary (e.g., room occupied, room unoccupied), such as via a motion sensor. One type of occupancy system makes use of a dedicated, room-based hardware device that measures an individual's presence in the room through air pressure changes, optical flow, and/or other remote sensing techniques. These approaches, for a particular room, are quite accurate at determining if the room is in one of two possible states: occupied or empty. Because the sensor directly measures characteristics of the room, it often cannot distinguish between a single occupant and multiple occupants. Typically, the room occupancy sensor connects to a processing system that processes the occupancy signal for other tasks (e.g., powering the room lighting). When using sensors such as these, the output "occupied/empty" does not need to be learned/trained over time because the sensor directly measures a feature correlated with the room occupancy function. A single sensor associated with the room, even if it can distinguish between one or multiple individuals in a room, typically cannot associate occupancy with a particular device. Furthermore, these occupancy sensor methods require a dedicated device whose only role is occupancy detection of the room.

Other approaches that focus directly on measuring the presence of a specific individual typically transmit (or simply receive) a signal from a device that informs a sensor in the room about the presence of a particular device. These approaches have been used to measure distance to a base station for a variety of applications including object tracking, commerce, and wayfinding. Other techniques rely on wireless (802.11) signal strength or even acoustic sensors to map signal strength to distance. There are several failings with these approaches. For example, even assuming that signal strength is a stable feature that can be used to determine distance (often interference at particular points in the room will distort these measurements), determining distance is not enough. A secondary mapping that determines, for given distances to the base station(s), if that device is "in" or "out" of the room must be defined. At a minimum, this secondary mapping requires an estimate of room size so it can be thresholded. Given that rooms can be different sizes and shapes, this typically is done manually and is, as a result, cumbersome and inaccurate. More importantly, if a room is not circularly shaped from the base station, then at the same distances a device can be "in" the room or "out" of the room. Simply put, this is a one-to-many mapping of distance to position for which no known function exists.

Other prior art approaches seek to avoid the issues with direct distance functions by instead triangulating many such signals in the room to determine a specific location/position of the device. Multiple sensors triangulate estimates to improve accuracy as well as map the position of the measured device to a Cartesian plane. These methods are disadvantageous because they still require an explicit secondary mapping that determines occupancy once a position is estimated. The secondary mapping requires specific and more detailed information about the room shape relative to the positional estimates so that an algorithm (such as the point-in-polygon test) can determine if the device is within the room. Moreover, triangulation require data from multiple hardware devices located at fixed and known locations throughout the room.

SUMMARY OF THE EMBODIMENTS

One or more wireless signals in a room may be used to predict occupancy of a mobile device in the room, i.e., whether the mobile device is physically located in the room or out of the room. The prediction is based upon characteristics of the wireless signals, as measured by the mobile device in the room. Examples of measured signal characteristics include average power, frequency response (e.g., Fourier coefficients), or ratios of Fourier coefficients. The wireless signals may originate within the same room as the mobile device, or elsewhere, such as other rooms of the building, other buildings, cellular communication transceivers, and other nearby devices outside of the building.

Embodiments herein utilize the fact that the signal characteristics are essentially unique to a room, and can therefore serve as a "signature" from which the occupancy of the mobile device in the room can be determined with a high probability (e.g., greater than 90%). The signal characteristics are essentially unique to a room for several reasons. First, wireless signals are distorted and attenuated when propagating through walls and other obstacles, and when reflecting off surfaces. Thus, a wireless signal may be more powerful in one room than another, thereby giving rise to signal characteristics that differ between the two rooms. The signal characteristics may also depend on a distance to the emitter, as well as the design of the emitter (e.g., gain, directivity, and bandwidth of an antenna used to transmit the wireless signal). For example, a mobile device may be located relative far from the transmitting antenna, yet still measure a high signal power if the mobile device is located in a lobe of the transmitting antenna's radiation pattern. Similarly, the mobile device may be located relatively close to the transmitting antenna, yet measure a small power if the mobile device is located within a null of the transmitting antenna's radiation pattern.

In rare situations, the signal characteristics measured by a mobile device are similar for two different rooms, thereby preventing the room occupancy of the mobile device from being uniquely determined from the measured signal characteristics. In these situations, the mobile device may measure additional characteristics of a second wireless signal, thereby allowing the room occupancy of the mobile device to be uniquely determined based on the additional signal characteristics. The probability that characteristics of a single wireless signal are similar in multiple rooms is small. Therefore, as the number of measurable wireless signals in a room increases, and the number of corresponding measured signal characteristics also increases, the corresponding signature of the room becomes increasingly unique.

Any wireless signal that can be detected in the room by the mobile device can be measured to form part of the room's signature. Due to the widespread use of wireless communication systems, there may be several dozen, if not more, wireless signals in a single room that are measurable by a single mobile device. For example, some of these wireless signals may be service set identifiers (SSIDs) broadcast by Wi-Fi routers (and other Wi-Fi devices) to announce the presence of wireless networks, or other communications between Wi-Fi devices. Some of the wireless signals may be Bluetooth signals, such as communications between Bluetooth devices or identifiers broadcast by Bluetooth beacons. The wireless signals may correspond to another type of digital radio specification, such as Wireless USB and ZigBee. The wireless signals may also include cellular communication signals operable with a cellular network. The wireless signals may include any other type of electromagnetic radiation capable of transferring data between parties without electrical conductors.

In embodiments, the signal characteristics measured by the mobile device are communicated to a classifier that predicts the occupancy of the mobile device based on the signal characteristics. The classifier is implemented as a mathematical function that receives one set of measured signal characteristics as an input, and returns a probability that the mobile device that measured the signal characteristics is in the room. In the following description, the classifier is presented as an artificial neural network (ANN) having a plurality of input nodes and one output node. However, another type of machine-learning algorithm may be used without departing from the scope hereof, such as a support vector machine, binary classification tree, or random forest. In one embodiment, the classifiers for a plurality of rooms are combined into a single ANN, wherein the number of output nodes equals the number of rooms and each output node outputs the probability that the mobile device is in the one room corresponding to that output node.

Embodiments also provide for supervisory learning (i.e., training) of the classifier. In one embodiment, a user of the mobile device interacts with another device in the room to verify that the mobile device is physically present in the room. Upon verification, the mobile device generates a supervisory signal that is combined with the measured signal characteristics to produce one training example. The mobile device communicates the training example to the classifier, where it is used to train the classifier to predict in-room occupancy of the mobile device. Furthermore, the verified in-room occupancy of the mobile device also verifies that the mobile device is not located in any other room. Thus, the classifier may communicate the same measured signal characteristics to other classifiers that predict occupancy in other rooms. These other classifiers may then be trained with the same signal characteristics to predict out-of-room occupancy of the mobile device.

The classifier may be implemented in hardware physically located in or near the same room for which it predicts occupancy. Furthermore, the classifier may be implemented using network-connected hardware already present in the room, such as computing equipment (e.g., wireless routers), teleconferencing equipment, and display equipment (e.g., projectors and video displays). For example, the classifier may be implemented with a Solstice Pod, a wireless screen-sharing system manufactured by Mersive Technologies, Inc. When a mobile device connects to the Solstice Pod, occupancy of the mobile device in the room is verified, allowing the mobile device to generate training examples for the classifier and wirelessly transmit these training examples to the Solstice Pod. In other embodiments, the classifier is implemented on hardware not located in the corresponding room. For example, the classifiers for several rooms may be co-located on a computer server that communicates remotely with the mobile devices (e.g., via wireless or wired network channels).

As will be appreciated by those trained in the art, for a classifier to predict room occupancy with a high accuracy, the classifier must be trained with a significant number of training examples. Presented herein are several examples of how training examples may be generated under a variety of scenarios. For example, in some embodiments, a user reads a unique identification (ID) code upon entering a room, and then enters the ID code into his or her mobile device to verify the presence of their mobile device in the room. In another example, the mobile device verifies the presence of the mobile device without any explicit prompting of the user by recognizing use of the mobile device (e.g., interactions with applications) that is only meaningful if the user and their mobile device are physically present in the room. For example, after connecting a mobile device to a Solstice Pod, the user of the mobile device may then access software on their mobile device to interact with the Solstice Pod, such as displaying content on the display connected to the Solstice Pod. Such an action is only meaningful if the user and their mobile device are in the same room as the display and the Solstice Pod, and therefore such actions are interpreted as verification that the mobile device is in the room. Furthermore, while the user continues to interact with the Solstice Pod using his or her mobile device, additional training samples can be generated from new measurements of the wireless signals. Therefore, it may be possible for a single mobile device to generate thousands of training examples, if not more, during a single meeting (e.g., per hour).

With training, the classifier can advantageously maintain a high prediction accuracy even as the measured signal characteristics change over time. For example, some wireless signals may only be measurable at certain times, such as when their corresponding emitters are operational (e.g., powered on). New wireless signals, and new signal characteristics derived therefrom, may also become detectable in a room at different times. Signal characteristics may also change over time due to reconfiguration of existing emitters and/or physical barriers between the emitters and the mobile device. The emitters may also age over time, changing their signal characteristics accordingly.

To accommodate varying numbers of wireless signals in a room, some embodiments utilize a hash function to map identifying information of each wireless signal (e.g., a MAC address, SSID, UUID, etc.) to specific input nodes of the ANN-based classifier. This use of hash functions ensures that when one wireless signal is received by multiple mobile devices in a room, the corresponding training examples are input to the ANN identically. The number of input nodes of the ANN may be sized to minimize hash collisions.

In some embodiments, systems herein receive identifying information of a mobile device with the signal parameters measured therefrom. By recording this identifying information, these embodiments can advantageously determine a number of mobile devices in the room at any time. These embodiments therefore overcome the disadvantages of prior-art binary occupancy sensors (e.g., motion sensors) that are only capable of detecting if one or more person is in the room (as opposed to detecting the exact number of people).

Embodiments herein advantageously operate without measuring and/or estimating distances, thereby overcoming many of the disadvantages of distance-based room occupancy approaches discussed above in the Background. As such, embodiments herein are not burdened with explicit representations of the room shape and/or size, layout of objects in the room, and/or physical arrangement of the mobile devices. In fact, embodiments herein can predict room occupancy with high accuracy regardless of room shape and/or size, and a number and/or arrangement of objects located therein.

Embodiments herein may be advantageously used in a variety of buildings, campuses, and environments having multiple rooms. Examples include office buildings, schools, hotels, conference centers, shopping malls, apartment buildings, dormitories, and hospitals. Embodiments may even be used to determine occupancy within one of several buildings on a campus, or within one of several houses in a neighborhood.

In a first aspect, a system that determines room occupancy includes an occupancy determiner configured to: broadcast a wireless occupancy signal corresponding to a unique ID code, receive a positive occupancy indication including a first signal parameter set and the unique ID code, the first signal parameter set including information about the wireless signal received at a mobile device, determine occupancy data of a room based on the first signal parameter set.

In some embodiments of the first aspect, the unique ID code is displayed within the room on a display.

In a first aspect, a system that determines occupancy of a mobile device in a room includes a processor, a memory communicatively coupled with the processor, and a classifier implemented as machine-readable instructions stored in the memory and configured to control the processor to calculate an occupancy probability from one or more wireless-signal characteristics measured by a mobile device from a wireless signal. The system also includes machine-readable instructions stored in the memory and configured to control the processor to: receive the wireless-signal characteristics from the mobile device, and predict the occupancy of the mobile device in the room by using the classifier to calculate the occupancy probability from the received wireless-signal characteristics.

In some embodiments of the first aspect, the wireless-signal characteristics include at least one of: an average power of the wireless signal, one or more Fourier coefficients of a spectrum of the wireless signal, and one or more ratios of Fourier coefficients of the spectrum of the wireless signal.

In some embodiments of the first aspect, the classifier is an artificial neural network.

In some embodiments of the first aspect, the memory stores additional machine-readable instructions that control the processor to receive a wireless-signal identifier of the wireless signal detected by the mobile device, the wireless-signal identifier uniquely identifying the wireless signal. In addition, the machine-readable instructions that control the processor to predict the occupancy of the mobile device include machine-readable instructions that control the processor to input the wireless-signal characteristics to the classifier based on the wireless-signal identifier, and use the classifier to calculate the occupancy probability from the inputted wireless-signal characteristics.

In some embodiments of the first aspect, the classifier is an artificial neural network (ANN) having a plurality of input nodes, the system further includes a hash function implemented as machine-readable instructions stored in the memory and configured to control the processor to calculate an offset-node of the ANN from the wireless-signal identifier, and the machine-readable instructions that control the processor to input the wireless-signal characteristics to the classifier based on the wireless-signal identifier includes machine-readable instructions that control the processor to: use the hash function to calculate the offset-node of the ANN from the wireless-signal identifier, and input the wireless-signal characteristics to the ANN starting at the offset-node of the plurality of input nodes.

In some embodiments of the first aspect, the system further includes machine-readable instructions that control the processor to receive from the mobile device a mobile identifier that uniquely identifies the mobile device, and store the occupancy probability with the mobile identifier in the memory.

In some embodiments of the first aspect, the memory stores additional machine-readable instructions that control the processor to train the classifier with a training example formed from an occupancy indication and the received wireless-signal characteristics.

In some embodiments of the first aspect, the occupancy indication is one of: (i) a positive occupancy indication verifying that the mobile device was in the room when the mobile device measured the at least one wireless signal, and (ii) a negative occupancy indication verifying that the mobile device was out of the room when the mobile device measured the at least one wireless signal.

In some embodiments of the first aspect, the system further includes machine-readable instructions that control the processor to receive from the mobile device a mobile identifier that uniquely identifies the mobile device, and store the occupancy indication with the mobile identifier in the memory.

In some embodiments of the first aspect, the memory stores additional machine-readable instructions that control the processor to receive the occupancy indication from the mobile device with the wireless-signal characteristics.

In some embodiments of the first aspect, the memory stores additional machine-readable instructions that control to processor to receive a code inputted to the mobile device when the mobile device measured the wireless signal in the room, and generate the positive occupancy indication when the inputted code matches an identification code associated with the system.

In some embodiments of the first aspect, the memory stores additional machine-readable instructions that control to processor to generate the negative occupancy indication when the inputted code does not match the identification code associated with the system.

In some embodiments of the first aspect, the memory stores additional machine-readable instructions that control the processor to receive a wireless-signal identifier detected by the mobile device when measuring the wireless signal, the wireless-signal identifier uniquely identifying the wireless signal. In addition, the machine-readable instructions that control the processor to train the classifier include machine-readable instructions that control the processor to train the classifier with the training example and based on the wireless-signal identifier.

In some embodiments of the first aspect, the classifier is an artificial neural network (ANN) having a plurality of input nodes, and the system further includes a hash function implemented as machine-readable instructions stored in the memory and configured to control the processor to calculate an offset-node of the ANN from the wireless-signal identifier. In addition, the machine-readable instructions that control the processor to train the classifier with the training example and based on the wireless-signal identifier include machine-readable instructions that control the processor to: use the hash function to calculate the offset-node of the ANN from the wireless-signal identifier, and input the wireless-signal characteristics to the ANN starting at the offset-node of the plurality of input nodes.

In some embodiments of the first aspect, the wireless signal originates from outside the room.

In some embodiments of the first aspect, the wireless signal originates from inside the room.

In some embodiments of the first aspect, the system further includes a transceiver communicatively coupled with the memory and the processor to receive the wireless-signal characteristics from the mobile device.

In some embodiments of the first aspect, the transceiver is a wired transceiver configured to receive the wireless-signal characteristics via wired communication.

In some embodiments of the first aspect, the transceiver is a wireless transceiver configured to receive the wireless-signal characteristics via wireless communication.

In some embodiments of the first aspect, the wireless signal measured by the mobile device is wirelessly transmitted by the transceiver.

In a second aspect, a method that determines occupancy of a mobile device in a room includes receiving wireless-signal characteristics measured by the mobile device from a wireless signal, and predicting the occupancy of the mobile device in the room by using a classifier to calculate an occupancy probability from the received wireless-signal characteristics.

In some embodiments of the second aspect, the method further includes wirelessly transmitting the wireless signal.

In some embodiments of the second aspect, the wireless-signal characteristics include at least one of: an average power of the wireless signal, one or more Fourier coefficients of a spectrum of the wireless signal, and one or more ratios of Fourier coefficients of the spectrum of the wireless signal.

In some embodiments of the second aspect, the method further includes receiving a wireless-signal identifier of the wireless signal detected by the mobile device, the wireless-signal identifier uniquely identifying the wireless signal. In addition, predicting the occupancy of the mobile device includes inputting the wireless-signal characteristics to the classifier based on the wireless-signal identifier, and using the classifier to calculate the occupancy probability from the inputted wireless-signal characteristics.

In some embodiments of the second aspect, the classifier is an artificial neural network (ANN) having a plurality of input nodes, and inputting the wireless-signal characteristics includes: using a hash function to calculate an offset-node of the ANN from the wireless-signal identifier, and inputting the wireless-signal characteristics to the ANN starting at the offset-node of the plurality of input nodes.

In some embodiments of the second aspect, the method further includes receiving from the mobile device a mobile identifier that uniquely identifies the mobile device, and storing the occupancy probability with the mobile identifier.

In some embodiments of the second aspect, the method further includes training the classifier with a training example formed from an occupancy indication and the received wireless-signal characteristics.

In some embodiments of the second aspect, the occupancy indication is one of: (i) a positive occupancy indication verifying that the mobile device was in the room when the mobile device measured the at least one wireless signal, and (ii) a negative occupancy indication verifying that the mobile device was out of the room when the mobile device measured the at least one wireless signal.

In some embodiments of the second aspect, the method further includes receiving from the mobile device a mobile identifier that uniquely identifies the mobile device, and storing the occupancy indication with the mobile identifier.

In some embodiments of the second aspect, the method further includes receiving the occupancy indication from the mobile device.

In some embodiments of the second aspect, the method further includes receiving a code inputted to the mobile device when the mobile device measured the wireless signal in the room, and generating a positive occupancy indication when the inputted code matches an identification code.

In some embodiments of the second aspect, the method further includes generating the negative occupancy indication when the inputted code does not match the identification.

In some embodiments of the second aspect, the method further includes receiving a wireless-signal identifier detected by the mobile device when measuring the wireless signal, the wireless-signal identifier uniquely identifying the wireless signal. In addition, training the classifier includes training the classifier with the training example and based on the wireless-signal identifier.

In some embodiments of the second aspect, the classifier is an artificial neural network (ANN) having a plurality of input nodes, and training the classifier with the training example and based on the wireless-signal identifier includes: using a hash function to calculate an offset-node of the ANN from the wireless-signal identifier, and inputting the wireless-signal characteristics to the ANN starting at the offset-node of the plurality of input nodes.

In a third aspect, a system that determines occupancy of a mobile device in a room, includes an occupancy determiner configured to receive from a mobile device (i) a room identification code inputted to the mobile device, and (ii) a first signal parameter set of at least one wireless signal measured by the mobile device upon entering the room. The occupancy determiner is further configured to train a classifier of the occupancy determiner with the first signal parameter set and a positive occupancy indication when the received room identification code matches a unique identification code assigned to the room.

In some embodiments of the third aspect, the system includes a display configured to display the unique identification code in the room.

In some embodiments of the third aspect, the occupancy determiner is integral to the display.

In some embodiments of the third aspect, the occupancy determiner is integral within the mobile device.

In some embodiments of the third aspect, the occupancy determiner is further configured to wirelessly transmit the unique identification code to the mobile device upon entering the room.

In some embodiments of the third aspect, the occupancy determiner is further configured to receive from the mobile device an additional signal parameter set of at least wireless signal measured with the mobile device. The occupancy determiner is also further configured to train the classifier with the additional signal parameter set and the positive occupancy indication when the additional signal parameter set matches the first signal parameter set.

In some embodiments of the third aspect, the occupancy determiner is further configured to receive from the mobile device (i) a disconnect notification entered to the mobile device, and (ii) a second signal parameter set of at least one wireless signal measured by the mobile device after the disconnect notification was entered to the mobile device. The occupancy determiner is also further configured to train the classifier with the second signal parameter set and a negative occupancy indication.

In some embodiments of the third aspect, the occupancy determiner is further configured to train the classifier with the additional signal parameter set and the negative occupancy indication when the additional signal parameter set matches the second signal parameter set.

In some embodiments of the third aspect, the occupancy determiner includes a supervisory learning algorithm that trains the classifier.

In a fourth aspect, a mobile device having occupancy determination includes a transceiver, an interface configured to receive a room identification code, and a signal analyzer configured to receive, via the transceiver, at least one wireless signal when the room identification code is inputted to the interface. The signal analyzer is further configured to generate a first signal parameter set from the at least one received wireless signal, and the mobile device is configured to communicate the first signal parameter set to an occupancy determiner.

In some embodiments of the fourth aspect, the interface is further configured to receive a disconnect notification. In addition, the signal analyzer is further configured to receive, via the transceiver, at least one wireless signal after the disconnect notification is received, and generate a second signal parameter set from the at least one received wireless signal. In addition, the mobile device is further configured to communicate the second signal parameter set to the occupancy determiner.

In some embodiments of the fourth aspect, the interface is configured to interact with a user of the mobile device to receive the disconnect notification via: prompting the user with an exited-room prompt; verifying the disconnect notification when a response to the exited-room prompt indicates the mobile device is not in the room; and denying the disconnect notification when the response to the exited-room prompt indicates the mobile device is in the room.

In a fifth aspect, a method that determines occupancy of a mobile device in a room includes receiving from the mobile device (i) a room identification code inputted to the mobile device, and (ii) a first signal parameter set of at least one wireless signal measured by the mobile device upon entering the room. The method also includes training a classifier with the first signal parameter set and a positive occupancy indication when the received room identification code matches a unique identification code assigned to the room.

In some embodiments of the fifth aspect, the method further includes wirelessly transmitting the unique identification code to the mobile device upon entering the room.

In some embodiments of the fifth aspect, the method further includes receiving from the mobile device an additional signal parameter set of at least one wireless signal measured with the mobile device. The method also includes training the classifier with the additional signal parameter set and the positive occupancy indication when the additional signal parameter set matches the first signal parameter set.

In some embodiments of the fifth aspect, the method further includes receiving from the mobile device (i) a disconnect notification entered to the mobile device, and (ii) a second signal parameter set of at least one wireless signal measured by the mobile device after the disconnect notification was entered to the mobile device. The method also includes training the classifier with the second signal parameter set and a negative occupancy indication.

In some embodiments of the fifth aspect, the method further includes training the classifier with the additional signal parameter set and the negative occupancy indication when the additional signal parameter set matches the second signal parameter set.

In some embodiments of the fifth aspect, training the classifier includes training the classifier with a supervisory learning algorithm.

In some embodiments of the fifth aspect, the method further includes prompting the user to verify that the mobile device is one of: in the room, and out of the room.

BRIEF DESCRIPTION OF THE FIGURES

The foregoing and other features and advantages of the disclosure will be apparent from the more particular description of the embodiments, as illustrated in the accompanying drawings, in which like reference characters refer to the same parts throughout the different figures. The drawings are not necessarily to scale, emphasis instead being placed upon illustrating the principles of the disclosure.

DETAILED DESCRIPTION OF THE EMBODIMENTS

Figure 1:
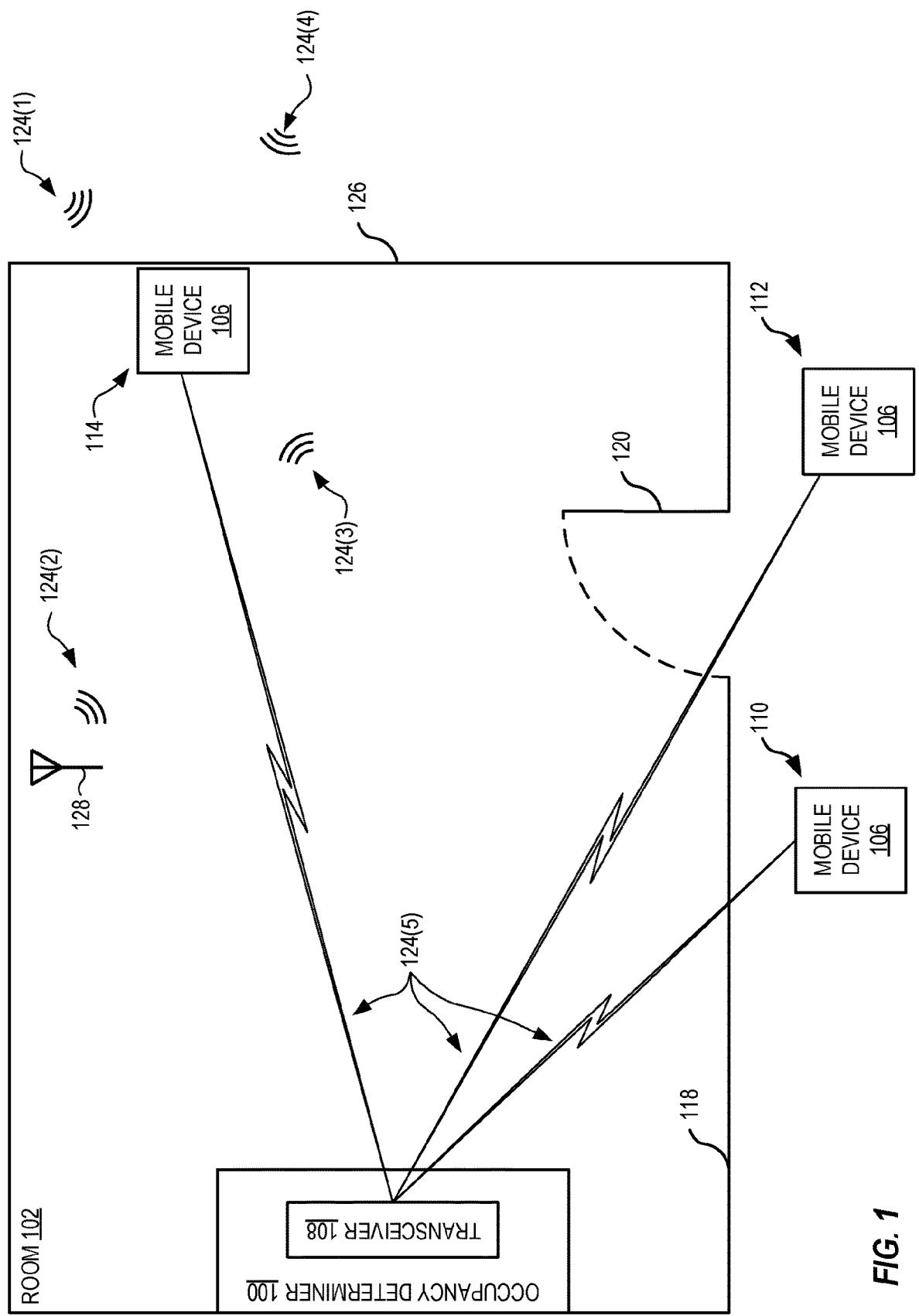
FIG. 1 shows an occupancy determiner that cooperates with a mobile device to determine occupancy of the mobile device in a single room, in embodiments.

FIG. 1 shows an occupancy determiner 100 that cooperates with a mobile device 106 to determine occupancy of the mobile device 106 in a room 102. The mobile device 106 detects and measures a plurality of wireless signals 124, some of which may originate within the room 102 (e.g., wireless signals 124(2) and 124(3)), and some of which may originate from outside of the room 102 (e.g., wireless signals 124(1) and 124(4)). While FIG. 1 shows the mobile device 106 measuring four wireless signals 124, the mobile device 106 may measure any number of wireless signals 124 without departing from the scope hereof.

With each of the wireless signals 124, the mobile device 106 measures one or more wireless-signal characteristics and a wireless-signal identifier. Examples of the wireless-signal characteristics include an average power, one or more Fourier coefficients of a spectrum of the received wireless signal, and one or more ratios of the Fourier coefficients. The wireless-signal identifier uniquely identifies each of the wireless signals 124, and may be, for example, a Wi-Fi secure set identifier (SSID), a MAC address and/or IP address of an emitter that transmitted the corresponding wireless signal 124, or a universal unique identifier (UUID).

The one or more wireless-signal parameters include values that characterize one of the wireless signals 124, as received by the mobile device 106. The wireless-signal parameters for all the measured wireless signals 124 form a signature unique to the room 102. That is, if the mobile device 106 were to measure the same wireless signals 124 in a different room, the mobile device 106 would obtain different wireless-signal parameters. Thus, the occupancy determiner 100 can use the wireless-signal parameters to differentiate between whether the mobile device 106 is in the room 102 and out of the room 102.

The mobile device 106 transmits the wireless-signal identifiers and corresponding measured wireless-signal characteristics of the measured wireless signals 124 to the occupancy determiner 100 via a transceiver 108. The occupancy determiner 100 then processes the received wireless-signal characteristics to determine the occupancy of the mobile device 106 in the room 102. In FIG. 1, the mobile device 106 is shown communicating wirelessly with the occupancy determiner 100 (e.g., Wi-Fi, ZigBee, cellular). Alternatively, the mobile device 106 may communicate with the occupancy determiner 100 via a wired connection (e.g., Ethernet, USB).

In FIG. 1, where the occupancy determiner 100 is physically located in the room 102 and includes a wireless transceiver 108, a wireless signal 124(5) emitted by the transceiver 108 may be measured by the mobile device 106 as one of the wireless signals 124. However, it is not necessary for the occupancy determiner 100 to operate wirelessly; the mobile device 106 can measure wireless signals 124 emitted from other devices. In some embodiments, the occupancy determiner 100 is not physically located in the room 102 yet still communicable with the mobile device 106 (e.g., via a local-area network or a wide-area network).

FIG. 1 shows the mobile device 106 at three positions where the mobile device 106 will measure different wireless-signal characteristics for the wireless signal 124(5). At a position 110, the mobile device 106 is in a hallway outside of the room 102. At a position 112, the mobile device 106 is in the hallway outside of the room 102, but close to a door 120 of the room 102. At a position 114, the mobile device 106 is in the room 102. As shown in FIG. 1, various obstacles may alter the wireless signals 124, and thus how the mobile device 106 measures the corresponding wireless-signal characteristics. For example, at the position 110, the mobile device 106 receives the wireless signal 124(5) as altered by a wall 118. At the position 112, when the door 120 is open, the mobile device 106 receives the wireless signal 124(5) without any interfering obstacle, even though the mobile device 106 is outside of the room 102. At the position 114, the mobile device 106 also receives the wireless signal 124(5) unaltered by any intervening obstacle.

Since the positions 112 and 114 are equidistant from the transceiver 108 and have direct line-of-sight to the transceiver 108, the mobile device 106 may measure similar wireless-signal characteristics for the wireless signal 124(5) at these two positions. In this case, the mobile device 106 may measure wireless-signal characteristics of other wireless signals (e.g., the wireless signals 124(1), 124(2), 124(3), and 124(4)) to further differentiate between the positions 112 and 114. For example, the wireless signal 124(2) may be transmitted by an antenna 128 located in the room 102 elsewhere from the transceiver 108 such that the positions 112 and 114 are not equidistant from the antenna 128. In this case, the mobile device 106 may measure a different power of the wireless signal 124(2) at the position 112, as compared to the position 114. Thus, the measured power of the wireless signal 124(2) can help distinguish between the positions 112 and 114.

In another example shown in FIG. 1, the wireless signal 124(1) originates outside of the room 102 and may be detected at the position 114 after propagating through one wall 126. However, to reach the position 112, the wireless signal 124(1) must propagate through two walls (i.e., the wall 126 and the wall 118). Due to the different number of intervening walls, the mobile device 106 may measure a higher power of the wireless signal 124(1) at the position 114, as compared to the position 112. Thus, the measured power of the wireless signal 124(1) may help distinguish between the positions 112 and 114.

It should be appreciated from the above discussion that a variety of additional factors will likely affect the wireless-signal characteristics measured by the mobile device 106. For example, the gain, directivity, and orientation of an antenna (e.g., the antenna 128) determines propagation of a wireless signal transmitted therefrom, and thus the corresponding wireless-signal characteristics measured by the mobile device 106 will depend upon the location of the mobile device 106 relative to the antenna and its propagation pattern. Other factors include reflections off, and absorption within, various obstacles and walls; these factors may in turn depend upon orientation, thickness, and material properties (e.g., permittivity and absorptivity) of the materials forming the obstacles. Many of these factors, such as absorptivity, also depend upon the frequency of the wireless signal.

Figure 2:
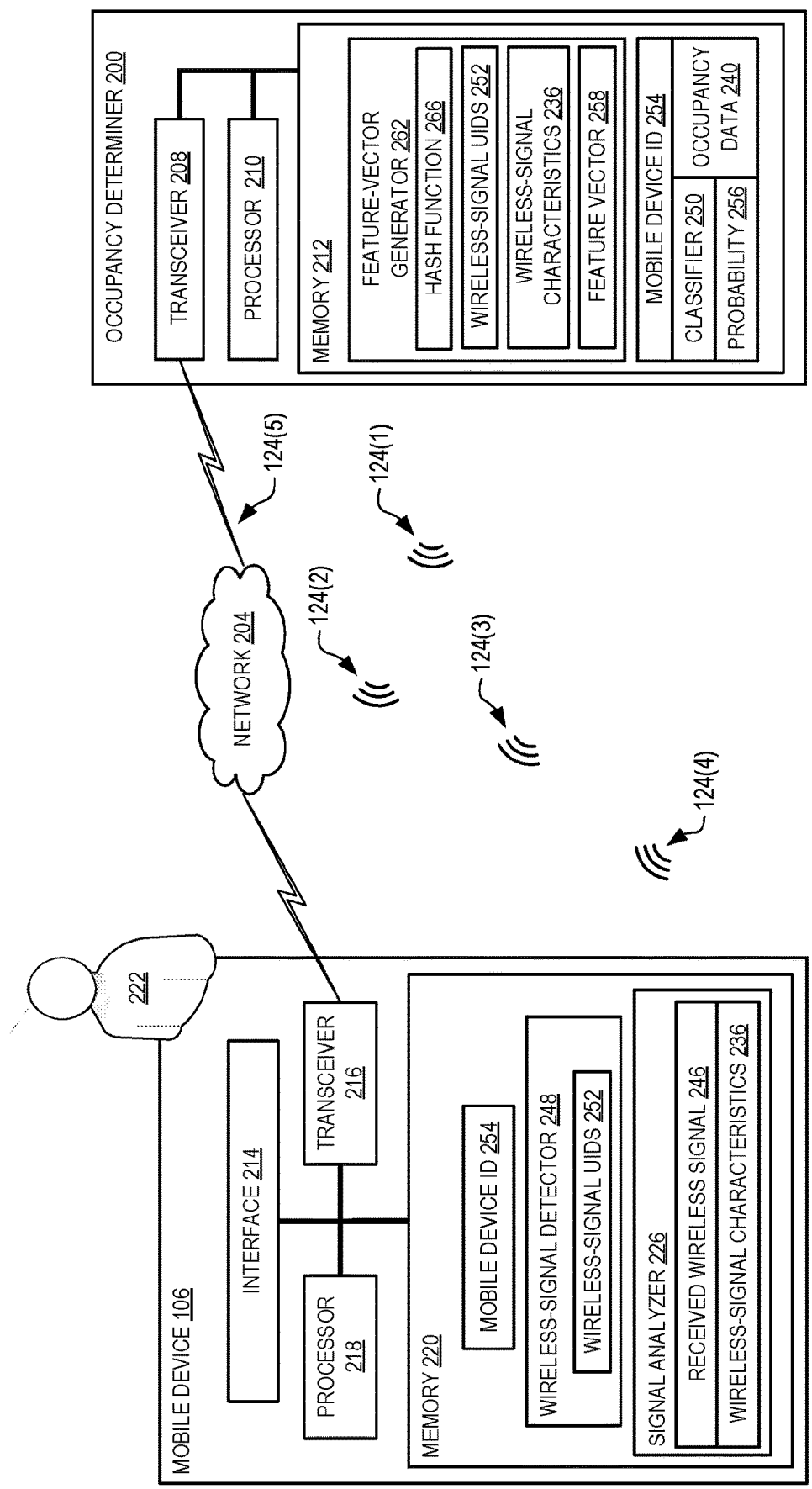
FIG. 2 shows one example of an occupancy determiner that cooperates with the mobile device to determine occupancy of the mobile device in the room, in embodiments.

FIG. 2 shows one example of an occupancy determiner 200 that cooperates with the mobile device 106 to determine occupancy of the mobile device 106 in the room 102. The occupancy determiner 200 is one example of the occupancy determiner 100 of FIG. 1. The occupancy determiner 200 includes a processor 210, a transceiver 208, and a memory 212 that are communicatively coupled to each other (e.g., via a bus). Similarly, the mobile device 106 includes a mobile processor 218, a mobile transceiver 216, an interface 214, and a mobile memory 220 that are communicatively coupled to each other. The memory 212 and the mobile memory 220 store data and machine-readable instructions that implement functionality described herein. The transceiver 208 is one example of the transceiver 108 of FIG. 1.

The mobile device 106 includes a wireless-signal detector 248 implemented as machine-readable instructions that are stored in the mobile memory 220 and configured to control the mobile processor 218 to detect wireless signals 124 with the mobile transceiver 216, and store in the mobile memory 220 a list of wireless-signal unique identifiers (UIDs) 252 that identify the detected wireless signals 124. For example, when the mobile device 106 is configured to operate wirelessly via Wi-Fi, the wireless-signal detector 248 may create a list of SSIDs obtained from the detected wireless signals 124. The wireless-signal detector 248 may also use for the wireless-signal UIDs IP addresses, MAC addresses, and/or other identifying information obtainable from the wireless signals 124.

The mobile device 106 also includes a signal analyzer 226 implemented as machine-readable instructions that are stored in the mobile memory 220 and configured to control the mobile processor 218 to receive one of the wireless signals 124, via the mobile transmitter 216, as a received wireless signal 246 stored in the memory 220. The signal analyzer 226 then processes the received wireless signal 246 to obtain one or more wireless-signal characteristics 236. For example, the signal analyzer 226 may implement a Fourier transform that computes a frequency spectrum of the received wireless signal 246 and stores one or more Fourier coefficients of the frequency spectrum as the wireless-signal characteristics 236. The mobile device 106 then transmits the wireless-signal characteristics 236 and a corresponding wireless-signal UID 252 to the occupancy determiner 200 via the network 204. The mobile device 106 may also transmit with the wireless-signal characteristics 236 a mobile device identifier 254 so that the occupancy determiner 200 can differentiate between the wireless-signal characteristics 236 measured with the mobile device 106, and wireless-signal characteristics measured with other devices.

The occupancy determiner 200 determines occupancy of the mobile device 106 using a classifier 250 that calculates from the received wireless-signal characteristics 236 an occupancy probability 256 that the mobile device 106 is in the room 102. The occupancy determiner 200 may then store the occupancy probability 256 in the memory 212 as occupancy data 240. Furthermore, the occupancy determiner 200 may store the mobile device identifier 254 with the occupancy probability 256 in the occupancy data 240 to track the occupancy of the mobile device 106. Thus, the occupancy data 240 is a register of all mobile devices interacting with the occupancy determiner 200. As such, the occupancy data 240 not only stores binary occupancy of the room (i.e., whether the room is occupied or not), but also the number of mobile devices therein.

In the following discussion, the classifier 250 is presented as an artificial neural network (ANN) having a plurality of input nodes and one output node. However, the classifier 250 may be implemented with another type of classification algorithm (e.g., binary classification tree, random forest, support vector machine) without departing from the scope hereof. When implemented as an ANN, the classifier 250 may have any number of layers, any number of nodes in any of the layers, and any type of artificial neuron function (e.g., ReLU, softmax, etc.) known in the art. The layers may be connected via any type of architecture, such as fully-connected, sparsely-connected, and recursive.

To input the wireless-signal characteristics 236 into the classifier 250, the occupancy determiner 200 includes a feature-vector generator 262 implemented as machine-readable instructions that are stored in the memory 212 and configured to control the processor 210 to arrange the wireless-signal characteristics 236 into a feature vector 258 that is subsequently inputted to the classifier 250. When the classifier 250 is an ANN, each element of the feature vector 258 may correspond to a unique input node of the ANN that receives one wireless-signal characteristic (e.g., a single value of power, a single real Fourier coefficient) of one wireless signal 124. To ensure that the same one wireless-signal characteristic of the one wireless signal 124 is always inputted to the same input node of the ANN, the feature-vector generator 262 may input the wireless-signal characteristics 236 into the feature vector 258 based on the corresponding wireless-signal UID 252. For example, the feature-vector generator 262 may map each wireless-signal UID to a unique index of the feature vector 258, and sequentially input the corresponding wireless-signal characteristics 236 to the feature vector 258 starting at the unique index. Neighboring indices returned by the mapping are spaced by the number of wireless-signal characteristics for a single wireless signal. For example, if there are five wireless-signal characteristics 236 for one wireless signal 124, and the mapping returns a starting index value of 6, the feature-vector generator 262 will input the five wireless-signal characteristics 236 into elements 6 through 10 of the feature vector 258. In this case, the mapping is prevented from returning each of index numbers 7 through 10 as a starting index.

In some embodiments, a hash function 266 maps each wireless-signal UID to a unique index of the feature vector 258. The feature-vector generator 262 may then enter the wireless-signal characteristics 236 sequentially into the feature vector 258 starting at the corresponding unique index. Thus, the hash function 266 ensures that the wireless-signal characteristics 236 obtained from one wireless signal 124 are always entered to the classifier 250 identically (i.e., into the same input nodes of the ANN) regardless of which mobile device measured the wireless-signal characteristics or when the wireless-signal characteristics were measured.

Advantageously, the hash function 266 allows input nodes of the ANN to be reused as new wireless signals 124 are detected in the room, and other wireless signals 124 are no longer detectable. To minimize hash collisions, the number of input nodes of the ANN is chosen to be large compared to the total number of wireless-signal characteristics expected. For example, if one wireless-signal characteristic is measured for one wireless signal (e.g., time-averaged power), then the total number of wireless-signal characteristics equals the number of wireless signals 124 detectable in the room. In this case, the number of input nodes (i.e., a length of the feature vector 258) may be chosen to be two orders of magnitude greater than an expected number of wireless signals 124 detectable in the room.

In some embodiments, usage of the hash function 266 is based on a type of the wireless signal 124 (e.g., Wi-Fi, Bluetooth, BLE). For example, Wi-Fi signals may be hashed to a first portion of the feature vector 258, while Bluetooth signals may be hashed to a remaining portion of the feature vector 258. In other embodiments, stable and/or reliable wireless signals (e.g., Wi-Fi access points, beacons, etc.) are "registered" by assigning to each of these stable signals a unique portion of the feature vector 258. These unique portions are excluded from the hash function 266, thereby preventing hash collisions with these stable signals. A remaining unregistered portion of the feature vector 258 may then be used for other wireless signals, such as Bluetooth signals that are only detectable when a Bluetooth device is in the room and powered on.

In one embodiment, the occupancy determiner 200 dynamically learns which wireless signals 124 in the room are stable and/or reliable, advantageously registering stable wireless signals automatically. For example, the occupancy determiner 200 may track usage of the wireless-signal UIDs 252 over time, and register a wireless signal 124 whose usage is consistently high over extended periods (e.g., days or weeks). The occupancy determiner 200 may maintain this wireless signal 124 as registered while its usage remains high. When the usage falls, the occupancy determiner 200 may unregister the wireless signal 124 and assign the corresponding wireless-signal characteristics to a different portion of the feature vector 258.

The transceiver 208 and the network 204 may operate according to one or more wired and/or wireless data transmission protocols including, but not limited to, the Internet, a local intranet, a Personal Area Network, a Local Area Network, a Wide Area Network, a virtual private network, cellular connections (3G, 4G, 5G, NB-1, etc.), WAP (Wireless Application Protocol), General Packet Radio Service, (Global System for Mobile Communication, Code Division Multiple Access, Time Division Multiple Access, Frequency Division Multiple Access, and/or Orthogonal Frequency Division Multiple Access, GPS, cellular digital packet data, Bluetooth, Z-wave protocol, an IEEE 802.11-based radio frequency network, or any other wired or wireless digital communication protocol.

The processor 210 is one or more computing devices configured to execute computer-readable instructions stored in the memory 212 to implement the functionality of the occupancy determiner 200 discussed herein. The memory 212 may include operating memory, such as random-access memory (RAM), as well as data storage, such as read-only memory (ROM), hard drives, flash memory, or any other suitable memory/storage element. The memory 212 may include internal or external memory elements, such as USB drives, Secure Digital card, magnetic, optical, and/or semiconductor memory.

The mobile device 106 may be a tablet, laptop computer, smartphone, or any other portable device. The interface 214 is a component of the mobile device 106 through which a user 222 interacts. For example, the interface 214 may be a display screen, a mouse, keyboard, a touchscreen of a mobile device, tablet, computer, etc. The mobile transceiver 216 is similar to transceivers 108 and 208, and may be any device capable of transmitting and/or receiving digital communications via network 204. The mobile processor 218 may be one or more computing devices configured to execute machine-readable instructions stored in the mobile memory 220 to implement the functionality of the mobile device 106 discussed herein. The mobile memory 220 may include operating memory, such as random-access memory (RAM), as well as data storage, such as read-only memory (ROM), hard drives, flash memory, or any other suitable memory/storage element. The mobile memory 220 may include removable memory elements, such as a CompactFlash card, a MultiMediaCard (MMC), and/or a Secure Digital (SD) card.

Training the Classifier

Figure 3:
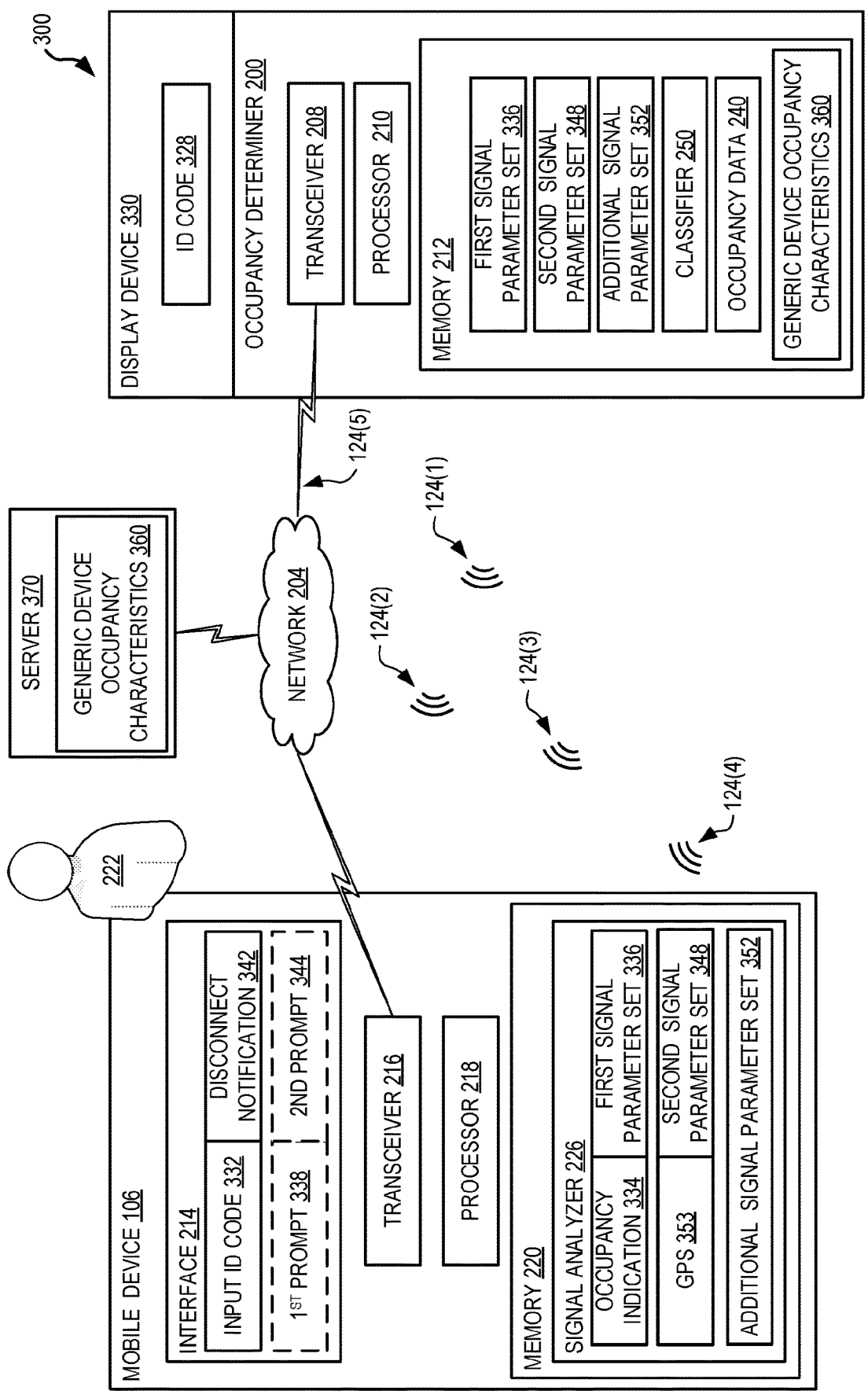
FIG. 3 is a functional diagram of one example system that determines occupancy of the mobile device in a room, in embodiments.

FIG. 3 is a functional diagram of one example system 300 that determines occupancy of the mobile device 106 in a room (e.g., the room 102 of FIG. 1). The system 300 includes the occupancy determiner 200 of FIG. 2, further configured with additional and/or alternative data and machine-readable instructions stored in the memory 212. Similarly, FIG. 3 shows the system 300 operating with the mobile device 106 of FIGS. 1-2, further configured with additional and/or alternative data and machine-readable instructions stored in the mobile memory 220. In FIG. 3, both the mobile device 106 and the occupancy indicator 200 are shown storing a first signal parameter set 336, a second signal parameter set 348, and at least one additional signal parameter set 352. Each of these signal parameter sets is one example of the wireless-signal characteristics 236 of FIG. 2.

The occupancy indictor 200 implements the classifier 250 as data and/or machine-readable instructions that are stored in the memory 212 and configured to control the processor 210 to predict the occupancy of the mobile device 106 using any of the signal parameter sets received from the mobile device 106. The classifier 250 may be represented as a mathematical function $f$ that receives a parameter set X and returns an occupancy probability y (e.g., the occupancy probability 256 of FIG. 2) that the mobile device 106 in the room, i.e., $y=f(X)$. In this case, the classifier 250 is a binary classifier. The occupancy determiner 200 may then store the occupancy probability y in the occupancy data 240.

Each time the mobile device 106 receives one or more wireless occupancy signals 124, the signal analyzer 226 processes the received wireless occupancy signals 124 to update one of the signal parameter sets 336, 348, and 352. The mobile device 106 then transmits the updated signal parameter set to the occupancy determiner 200 via the network 204. The occupancy determiner 200 inputs the updated signal parameter set to the classifier 250 to update the occupancy probability y and the occupancy data 240. Thus, the system 300 works with the mobile device 106 to repeatedly update its prediction that the mobile device 106 is in the room.

In addition to predicting the occupancy of the mobile device 106 in the room, the occupancy determiner 200 includes additional machine-readable instructions (e.g., stored in the memory 212) that train the classifier 250 with training examples. Each training example may have the form (X, O), where O is a binary variable indicating the known occupancy. For example, O=1 may indicate that the mobile device 106 is in the room, and O=0 may indicate that the mobile device 106 is not in the room. Each training example may be used to train the classifier 250 by minimizing a cost function with backpropagation, stochastic gradient descent, or another training algorithm known in the art.

Thus, the system 300 cooperates with the mobile device 106 to both train the classifier 250 and use the classifier 250 for predicting. In the following discussion, examples are given of how the system 300 may obtain training examples for training the classifier 250. As will be appreciated by those trained in the art, the accuracy of the predictions generated by the classifier 250 depends on how well the classifier 250 has been trained, i.e., how many training examples were used. Thus, the following examples are important for generating a significant number of training examples, as needed to ensure that the classifier 250, after training, predicts occupancy with sufficient accuracy.

A training example may be generated when the mobile device 106 receives a wireless signal 124 upon entering the room. A unique ID code 328 may be assigned to the occupancy determiner 200. In situations where there is a plurality of rooms that each have an associated occupancy determiner 200, each occupancy determiner 200 may be assigned a corresponding unique ID code 328. The unique ID code 328 is communicated to the mobile device 106 via audio, visual, optical and/or wireless means. For example, in FIG. 3 the unique ID code 328 may be displayed on a display device 330 that is integrated with the occupancy determiner 200 (e.g., a "smart display") or that is an off-the-shelf display that connects to a "pod" (e.g., the Solstice pod by Mersive Technologies Inc.) or another device configured to perform the functionality of the occupancy determiner 200. Upon entry to the room, the user 222 visually reads the unique ID code 328 from the display device 330 and enters the unique ID code 328 to the mobile device 106 via the interface 214. In another example, the unique ID code 328 is audibly played through speakers within the room and a microphone of the mobile device 106 (not shown in FIG. 1) records the audible sound to receive the unique ID code 328. In another example, the mobile device 106 wirelessly receives the unique ID code 328, for example, through infrared/optical transmission, SMS transmission or another means of data communication. In another example, the mobile device 106 includes a camera that scans the unique ID code 328 from the display device 330 in the form of a QR code, bar code, numerical code, or the like.

Upon receiving the unique ID code 328, the mobile device 106 stores the unique ID code as an input ID code 332, and the signal analyzer 226 sets an occupancy indication 334 in the mobile memory 220 to TRUE. When set to TRUE, the occupancy indication 334 indicates that the mobile device 106 is known to be in the room, i.e., the occupancy indication is a positive occupancy indication. Similarly, when set to FALSE, the occupancy indication 334 indicates that the mobile device 106 is known to be out of the room, i.e., the occupancy indication 334 is a negative occupancy indication. In embodiments where the user 222 interacts with the interface 214 to input the unique ID code 328, the occupancy indication 334 is automatically verified due to the actions of the user 222 (assuming the user 222 correctly entered the unique ID code 328). In embodiments where the unique ID code 328 is obtained without interaction by the user 222, the user 222 may be prompted (e.g., with a first prompt 338 displayed on the interface 214) requesting verification that the mobile device 106 is in the room; the response to the first prompt 338 entered by the user 222 verifies if the mobile device 106 is in the room or not.

After receiving the unique ID code 328, the mobile device 106 receives at least one wireless signal 124 (e.g., as the received occupancy signal 246). The signal analyzer 226 then processes the received wireless signal 124 to generate the first signal parameter set 336. The mobile device 106 then transmits the occupancy indication 334, the input ID code 332, and the first signal parameter set 336 to the occupancy determiner 302 via the network 204. Upon receiving this data from the mobile device 106, the occupancy determiner 200 compares the received ID code 332 to its unique ID code 328. If the two ID codes match, the occupancy determiner 200 stores the received occupancy indication 334 and the first signal parameter set 336 in the memory 212. The occupancy determiner 200 may then form one training example from the first signal parameter set 336 (i.e., X) and occupancy indication 334 (i.e., O=1), and train the classifier 250 with the one training example. Furthermore, since the mobile device 106 is known to be physically located in the room, the occupancy determiner 200 may also update the occupancy data 240 accordingly.

When the two ID codes do not match, the occupancy determiner 200 has received data intended for a different occupancy determiner, in which case the occupancy determiner 200 may either ignore the received occupancy indication 334 and first signal parameter set 336, or forward the received occupancy indication 334 and first signal parameter set 336 via the network 204 to the intended occupancy determiner. Furthermore, the occupancy 200 may train the train the classifier 250 with the unintended first signal parameter set 336 and a negative occupancy indication, as the mismatch of ID codes verifies that the unintended first signal parameter set 336 was generated by a mobile device in another room.

Advantageously, interaction with the interface 214 (e.g., by the user 222) eliminates the need for additional hardware and leverages existing hardware, such as smart displays and devices (e.g., the Solstice pod by Mersive Technologies Inc.). Furthermore, the occupancy determiner 200 can determine the exact number of mobile devices within the room, but does not require prior knowledge of the room size. In other words, the interaction with interface 214 does not require entry of the room size or shape characteristics to determine occupancy within the associated room.

The occupancy determiner 200 may also be configured to identify when the mobile device 106 is out of the room, in which case another training example may be generated when the mobile device 106 leaves the room. For example, when the user 222 leaves the room, the user 222 may interact with the interface 214 to generate a disconnect notification 342. The disconnect notification 342 may be generated manually when the user 222 interacts with the interface 214. In embodiments, the disconnect notification 342 may be generated in response to a second prompt 344. For example, the interface 214 may periodically generate the second prompt 344 saying "are you still in the room?" Furthermore, the disconnect notification 342 may be generated automatically, such as via the interface 214 receiving an electronic trigger from an electronic device (such as an RFID transmitter, an optical IR transmitter, etc.) when the user 222 leaves the room.

Upon receipt of the disconnect notification 342, the signal analyzer 226 may set the occupancy indication 334 to FALSE. The mobile device 106 may then receive a wireless signal 124 (e.g., update the received occupancy signal 246 in FIG. 2). The signal analyzer 226 then processes the received wireless signal 124 to generate the second signal parameter set 348. The mobile device 106 transmits the negative occupancy indication 334, the input ID code 332, and the second signal parameter set 348 to the occupancy determiner 200 via the network 204. Upon receiving this data from the mobile device 106, the occupancy determiner 200 compares the received ID code 332 to its unique ID code 328. If the two ID codes match, the occupancy determiner 200 then forms from the received occupancy indication 334 and the second signal parameter set 348 one training example that is used to train the classifier 250. Furthermore, since the mobile device 106 is known to be physically leaving the room, the occupancy determiner 200 may also update the occupancy data 240 accordingly.

Additional training examples may be generated every time that the mobile device 106 generates the second prompt 344 to determine if the user 222 is still in the room. Specifically, when the user 222 responds to the second prompt 344 by indicating that he or she is still in the room, the occupancy of the user 222 is known with certainty (i.e. occupancy indication 334 is equal to TRUE) and thus may serve as a supervisory signal for producing one training example. Signal analyzer 226 may then update the additional signal parameter set 352 based on a new measurement of at least one wireless signal 124, and transmit the updated additional signal parameter set 352 and the occupancy indication 334 (i.e., TRUE) to the occupancy determiner 200 for training the classifier 250 and updating the occupancy data 240.

It should be appreciated from the above discussion that a training example can be generated every time that (a) the mobile device 106 updates any of the signal parameter sets 336, 348, and 352 from a new measurement of at least one wireless signal 124, and (b) the occupancy of the mobile device 106 is known with certainty. For example, when the occupancy determiner 200 receives an in-room training example (i.e., O=1) with an input ID code 332 that does not match the unique ID code 328, then the occupancy determiner 200 has received a training example intended for a different occupancy determiner. In this case, the occupancy determiner 200 may assume that the mobile device that sent the communication is in a different room, and thus may train classifier 250 with the received parameter set and a supervisory signal O=0.

Each of the signal parameter sets 336, 348, and 352, may be represented as a single value, a one-dimensional vector of values, a two-dimensional matrix of values, or any other data structure sufficiently sized and configured to store the signal parameter set. For example, the signal parameter set may be represented as a vector $\vec{X}=(P_1, P_2, P_3, \ldots, P_N)$, where N is the number of signal parameters, and each element P is one parameter of one measured wireless signal 124. The signal parameters may be Fourier coefficients of the measured wireless signal 124. As another example, a single parameter P represents an average signal strength of the wireless signal 124 over a short period of time. The signal parameter set may also be one or more ratios between strengths of signal components (e.g., amplitudes of Fourier coefficients) of the received wireless signal 124, or one or more ratios between strengths of signal components of the received wireless signal 124. The signal parameter set may include all signal parameters of the received wireless signal 124, or only those parameters that have a significant effect on differentiating the mobile device 106 from other mobile devices in the room.

In many scenarios, multiple wireless signals 124 are needed to identify whether the mobile device 106 is in a given room. In such instances, a signal parameter set may be represented as a matrix $$\hat{X} = \begin{pmatrix} \vec{X}_1 \\ \vec{X}_2 \\ \vec{X}_3 \\ \vdots \\ \vec{X}_Z \end{pmatrix} = \begin{pmatrix} P_{1,1} & P_{1,2} & P_{1,3} & \cdots & P_{1,N} \\ P_{2,1} & P_{2,2} & P_{2,3} & \cdots & P_{2,N} \\ P_{3,1} & P_{3,2} & P_{3,3} & \cdots & P_{3,N} \\ \vdots & \vdots & \vdots & \ddots & \\ P_{Z,1} & P_{Z,2} & P_{Z,3} & & P_{Z,N} \end{pmatrix},$$

where each $\vec{X}_j$ is a vector-representation of the signal parameter set for room i, and Z is the number of rooms.

The occupancy probability may be expressed mathematically as $y=P(O=1|X)$, i.e., the conditional probability that the mobile device 106 is in the room (O=1) given the parameter set X. In some embodiments, logistic regression is used to estimate the occupancy probability according to $y=\text{sig}(\vec{w}^T \cdot \vec{X}+b)$, where sig( ) is the sigmoid function, $\vec{w}^T$ is a row vector of weights, b is an offset, and $\vec{X}$ is one signal parameter set expressed as a column vector. The sigmoid function serves as an artificial neuron of a neural network. Alternatively, the occupancy probability may be computed with another type of artificial neuron, such as a ramp function (e.g., rectified linear unit), softplus function, or step function.

The classifier 250 may be trained using machine-learning techniques known in the art. For example, optimal values for the weight $\vec{w}$ and offset b of the sigmoid function may be obtained to minimizing a cost function C that quantifies how "far" one solution (i.e., one choice of $\vec{w}$ and b) is from the optimal solution. One example of a cost function frequently used for training classifiers is the cross entropy:

$$C(O,y)=-O \log y-(1-O)\log(1-y)$$

A mean error E may be obtained by summing C over the complete set of m training values for a particular mobile device and room:

$$E(\vec{w}, b) = \frac{1}{m}\sum_{k=1}^{m} C(O_k, y_k)$$

The mean error E may then be minimized using known techniques, such as gradient descent.

In embodiments, training examples for training the classifier 250 include values of the supervisory signal O that are neither "1" (in-room) nor "0" (out-of-room). For example, consider the case where the mobile device 106 leaves the room, but the occupancy indication 334 is not updated to FALSE. In some embodiments, the signal analyzer 226 may monitor a GPS signal 353 or other positioning signal (e.g., from available networks not associated with the building in which the room is located) to infer that the mobile device 106 is no longer in the room. In this case, the first prompt 338 may be displayed to query a user (i.e., "It appears that you have left the room? Should I disconnect you from the display?"). If the user indicates to disconnect (i.e., generates the disconnect notification 342) and the GPS signal 338 indicates the mobile device 106 is, for example, 100 meters away from the room, then the classifier 250 may be trained with a training example in which the supervisory signal O is a likelihood that the mobile device 106 is still in the room (e.g., O=0.8). Using a signal parameter set X determined from at least one wireless signal 124, the classifier 250 may then be trained with the training example (X, 0.8).

In certain embodiments, the classifier 250 is trained only with training examples for which the mobile device 106 is known to be in the room (e.g., the supervisory signal O=1), such as when the occupancy indication 334 is set to TRUE when the user 222 enters the unique ID code 328 into the mobile device 106 via the interface 214. In such embodiments, the classifier 250 is trained to optimally predict when the mobile device 106 is in the room. However, the classifier 250 may not necessarily optimally predict when the mobile device 106 is out of the room.

In some embodiments, the occupancy determiner 200 uses generic device occupancy characteristics 360 to generate training examples for a new mobile device that has not yet transmitted to the occupancy determiner 200 any of its own training examples. For example, the new mobile device may belong to a new user that just entered the room, but has not entered the unique ID code 328 into his or her mobile device. The generic device occupancy characteristics 360 may be stored on a server 370 connected to the network 204, or local to the occupancy determiner 200 in the memory 212. The generic device occupancy characteristics 360 may include previously-trained classifiers 250, including previously-trained classifiers 250 trained with signal parameter sets from mobile devices of a particular brand and/or model.

As an example of how the occupancy determiner 200 may use the generic device occupancy characteristics 360, assume that the mobile device 106 is a certain brand of smartphone. Training examples received from the mobile device 106 (and optionally other mobile devices of the same brand and/or model) can be used to train the classifier 250 to predict occupancy of a new mobile device of the same brand, even if the new mobile device has not previously communicated any wireless-signal characteristics to the occupancy determiner 200. The more training examples received from a type (e.g., brand, model, age, etc.) of mobile device, the more accurate the classifier 250 can initially predict occupancy for a new mobile device of that type.

The classifier 250 may be trained to have knowledge of additional signal parameter sets indicating whether the corresponding mobile device 106 is either in-room or out-of-room. For example, the classifier 250 may be trained with a supervisory learning algorithm that monitors the at least one additional signal parameter set 352 to further train the classifier 250.

In embodiments, the supervisory learning algorithm (such as that shown in FIG. 6, discussed below) may monitor additional parameter set 352 and, using knowledge of the occupancy data 240 of the mobile device 106, add additional training data to the classifier 250. For example, if the occupancy determiner 200 knows that the mobile device 106 is in the room, such as by receiving the first signal parameter set 336, any additional signal parameter set 352 received before receipt of the second signal parameter set 348 may be used by the supervisory learning algorithm to train the classifier 250 with the positive occupancy indication.

Any of the above described features of the occupancy determiner 200 may be performed either remotely from the mobile device 106 or at the mobile device 106. For example, the occupancy determiner 200 may be located within or proximate to a smart display or a "pod", such as the Solstice pod by Mersive Technologies Inc., or another device that is configured to perform the functionality of the occupancy determiner 200. In some embodiments, however, one or more features of the occupancy determiner 200 are integral with the mobile device 106 such that the mobile device 106 includes the classifier 250 and is able to process first, second, and additional signal parameter sets 336, 348, 352 to automatically determine its own occupancy data 240. The mobile device 106 may then transmit, via the mobile transceiver 216 and the network 204, the mobile-device-generated occupancy data 240 to a third-party device, such as a smart display, a "pod" (as described above) or an occupancy server. This configuration provides the advantage that additional hardware is not needed to implement the system 300. In other words, only the mobile device 106 (which may be a smartphone) is needed.

In some embodiments, the transmitter 208 is part of a wireless router physically located in the room and part of the network 204. In this case, the occupancy determiner 200 communicates to the wireless router (e.g., via wired means) to broadcast one wireless signal 124 and communicate with mobile devices. Furthermore, in this situation the occupancy determiner 200 no longer needs to be physically located in the room, and instead may be located elsewhere (e.g., as part of a network server located elsewhere), provided that the occupancy determiner 200 can communicate with the display device 330 (e.g., the display device 330 has a transceiver for connecting to the network 204).

Figure 4:
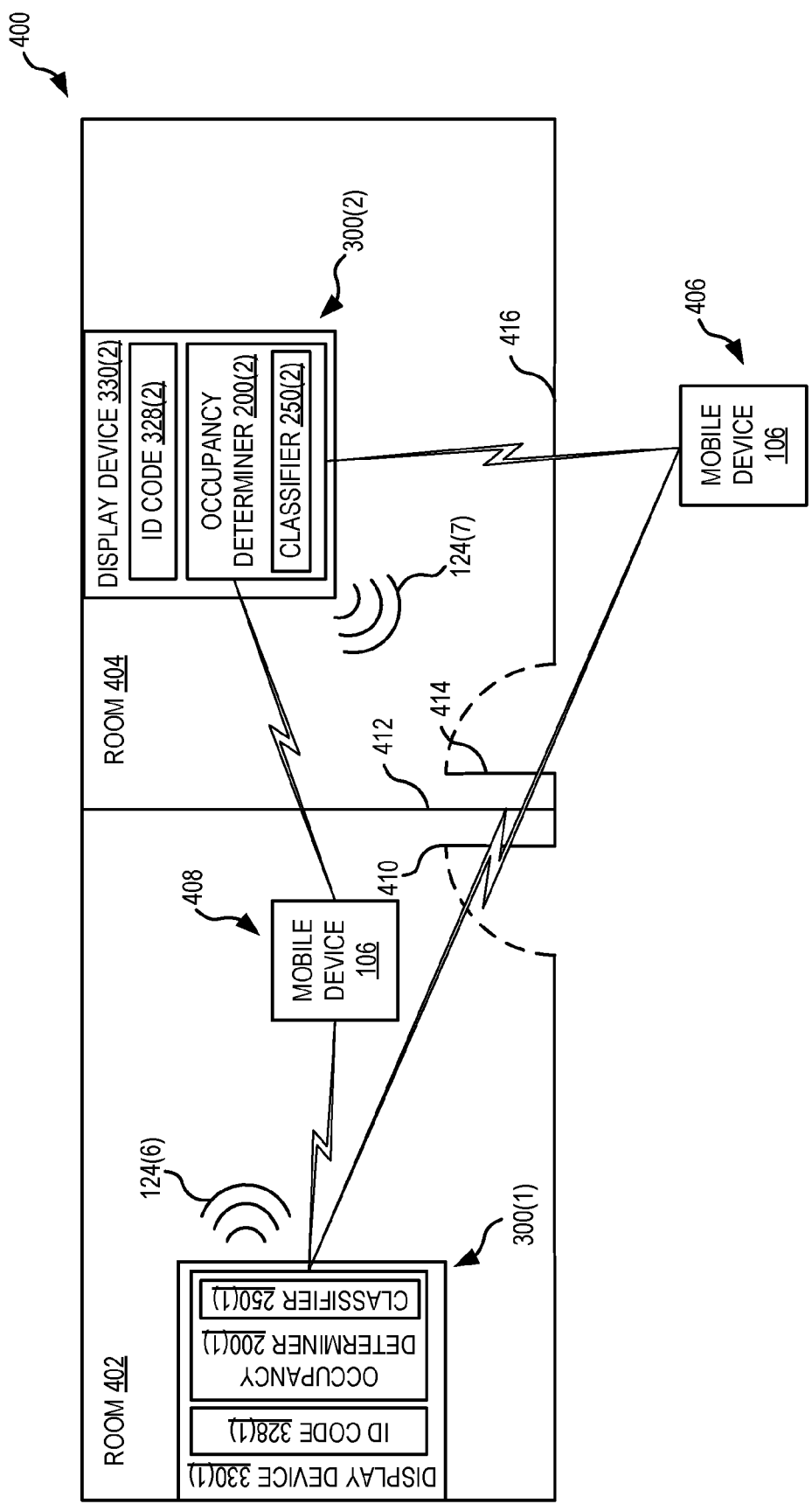
FIG. 4 depicts a room layout showing first and second systems of FIG. 3 located in first and second rooms, respectively, in embodiments.

FIG. 4 depicts a room layout 400 showing first and second systems 300(1), 300(2) of FIG. 3 located in first and second rooms 402, 404, respectively. In the layout 400, the first system 300(1) includes a first occupancy determiner 200(1) located within a first display device 330(1), and the second system 100(2) includes a second occupancy determiner 200(2) located within a second display device 330(2). At a position 406, the mobile device 106 is in a hallway of the building (e.g., outside of the rooms 402 and 404). At a position 408, the mobile device 106 is in the room 402.

As shown in FIG. 4, obstacles may alter first and second wireless signals 124(6), 124(7) broadcast by the first and second occupancy determiners 300(1), 300(2), respectively. For example, at the position 406, the mobile device 106 may still receive the first wireless signal 124(6), but it is altered by a first door 410, a wall 412, and a second door 414. At the position 406, the mobile device 106 may also receive the second wireless signal 124(7), but it is altered by only a wall 416. At the position 408, the mobile device 106 may receive an unaltered version of the first wireless occupancy signal 124(6), and a version of the second wireless signal 124(7) altered by the wall 412. In some scenarios, signal parameter sets generated from both wireless signals 124(6), 124(7) may improve the accuracy of both the first and second occupancy determiners 300(1) and 300(2) by providing additional training examples for training the classifiers 250(1) and 250(2). For example, if the mobile device 106 generated a signal parameter set from only the second wireless signal 124(7), the signal parameters may be the same at both positions 406 and 408. Use of additional wireless signal 124 therefore improves the quality of the training examples and the accuracy of the classifiers 250.

Multiple classifiers (e.g., classifier 250) may be generated for each room, and in certain embodiments, each mobile device. For example, FIG. 4 shows the first classifier 250(1) associated with the first room 402, and the second classifier 250(2) associated with the second room 404. As such, when a new room (the kth room) is fitted an occupancy determiner 200 and/or system 300, and connected to the mobile device 106, a new classifier $N_k$ is instantiated and a signal sample X at that moment of connection is used to begin training the classifier $N_k$. Eventually, the mobile device 106 is able to query several classifiers to determine if one mobile device recognizes a room (the network $N_p$ network, for example, returns a probability close to 1, indicating that the one mobile device is in the pth room).

Figure 5:
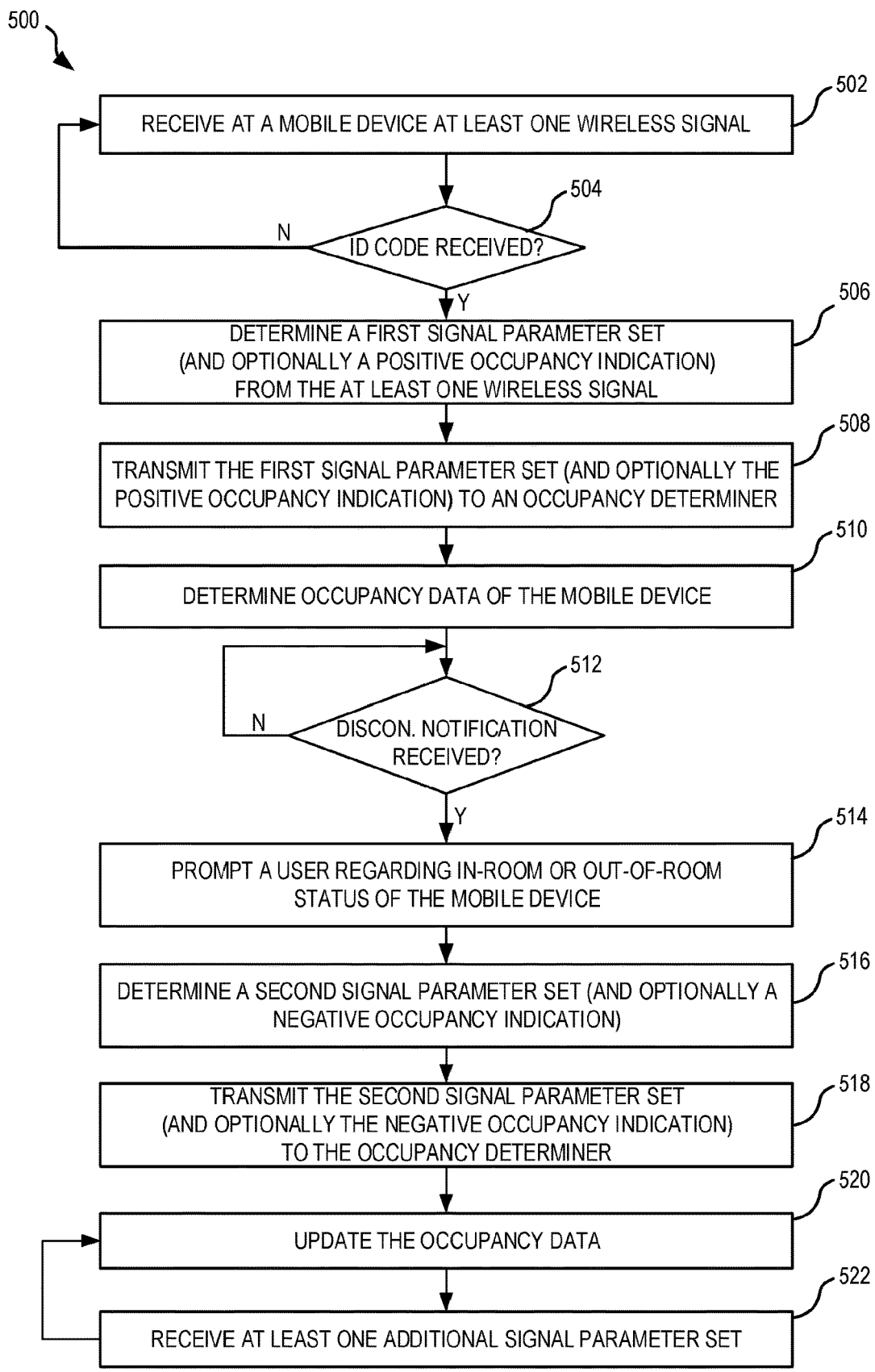
FIG. 5 shows one example of a method that determines occupancy of a mobile device in a room, in embodiments.

FIG. 5 shows one example of a method 500 that determines occupancy of a mobile device in a room. The method 500 may be implemented using one or more components of the occupancy determiners 100 and 200 described above and shown in FIGS. 1-4. At a block 502, the method 500 receives, at a mobile device, at least one wireless signal. In one example of the block 502, the mobile device 106 receives at least one wireless signal 124.

At a block 504, the method 500 determines if a unique ID code is received at the mobile device. If the unique ID code is received at the block 504, the method 500 proceeds to a block 506, else the method 500 continues to the block 502 to receive at least one wireless signal. In some embodiments, the method 500 does not affirmatively "receive" a wireless signal (i.e., process and store the data associated with the wireless signal) at block 502 until the unique ID code is received at the block 504. In one example of the block 504, the unique ID code 328 associated with the occupancy indicator 200 is inputted to the mobile device 106 via the interface 214, and stored in the mobile device 106 as the inputted ID code 332.

At a block 506, the method 500 determines a first signal parameter set (and optionally a positive occupancy indication) from the received wireless signal at the time the input ID code was inputted at the block 504. In one example of the block 506, the signal analyzer 226 generates the first signal parameter set 336 (and optionally sets the occupancy indication 334 to TRUE).

At a block 508, the method 500 transmits the determined first signal parameter set (and optionally the positive occupancy indication) to an occupancy determiner. In one example of the block 508, where the occupancy determiner 200 is remote from the mobile device 106, the first signal parameter set 336 (and optionally the positive occupancy indication 334) is transmitted via the mobile transceiver 216 and the network 204 to the occupancy determiner 200. In embodiments where the functionality of the occupancy determiner 200 is implemented within the mobile device 106, the block 508 may simply include accessing, using the occupancy determiner 200, the stored first signal parameter set 336 (and optionally the positive occupancy indication 334) from the mobile memory 220.

At a block 510, the method 500 determines occupancy data of the mobile device. In one example of the block 510, the occupancy determiner 200 determines the occupancy data 240 of the mobile device 106. In embodiments where the functionality of the occupancy determiner 200 is implemented within the mobile device 106, the occupancy data 240 may be transmitted from the mobile device 106 to an external device at the block 510.

At a block 512, the method 500 determines if a disconnect notification is received. If yes, the method 500 proceeds to a block 514, else the method 500 loops until a negative occupancy indication is received at the block 512. In embodiments, if a disconnect notification is not received at the block 512 for a predetermined period of time, the method 500 may perform one iteration of the block 514. In one example of the block 512, the mobile device 106 determines if the disconnect notification 342 is received.

At the block 514, the method 500 prompts a user regarding in-room or out-of-room status of the mobile device. In one example of the block 514, the second prompt 344 is displayed automatically via the interface 214 to the user 222 requesting whether the mobile device 106 is in-room or out-of-room.

In a block 516, the method 500 determines a second signal parameter set device (and optionally a negative occupancy indication) from another at least one received wireless signal measured by the mobile. The block 516 may be initiated when the response to the prompt of the block 514 indicates the mobile device is out-of-room. In embodiments, the block 516 may be initiated automatically when the disconnect notification is received at the block 512. In one example of the block 516, the signal analyzer 226 determines the second signal parameter set 348.

At a block 518, the method 500 transmits the determined second signal parameter set (and optionally the negative occupancy indication) to the occupancy determiner. In one example of the block 518, where the occupancy determiner 200 is remote from the mobile device 106, the second signal parameter set 348 (and optionally the negative occupancy indication 334) is transmitted via the mobile transceiver 216 and network 204 to the occupancy determiner 200. In embodiments where the functionality of the occupancy determiner 200 is implemented within the mobile device 106, the block 518 may simply include accessing, using the occupancy determiner 200, the stored second signal parameter set 348 (and optionally the negative occupancy indication 334) from the mobile memory 220.

At a block 520, the method 500 updates the occupancy data related to the mobile device. In one example of the block 520, the occupancy determiner 200 updates the occupancy data 240 with respect to the mobile device 106. In embodiments where the functionality of the occupancy determiner 200 is implemented within the mobile device 106, the occupancy data 240 may be transmitted to a third-party device remote from the mobile device 106.

At a block 522, the method 500 receives at least one additional signal parameter set. In one example of the block 522, the occupancy determiner 200 receives at least one additional parameter set 352 from the mobile device 106. The method 500 then repeats block 520 based on additional parameter sets.

Figure 6:
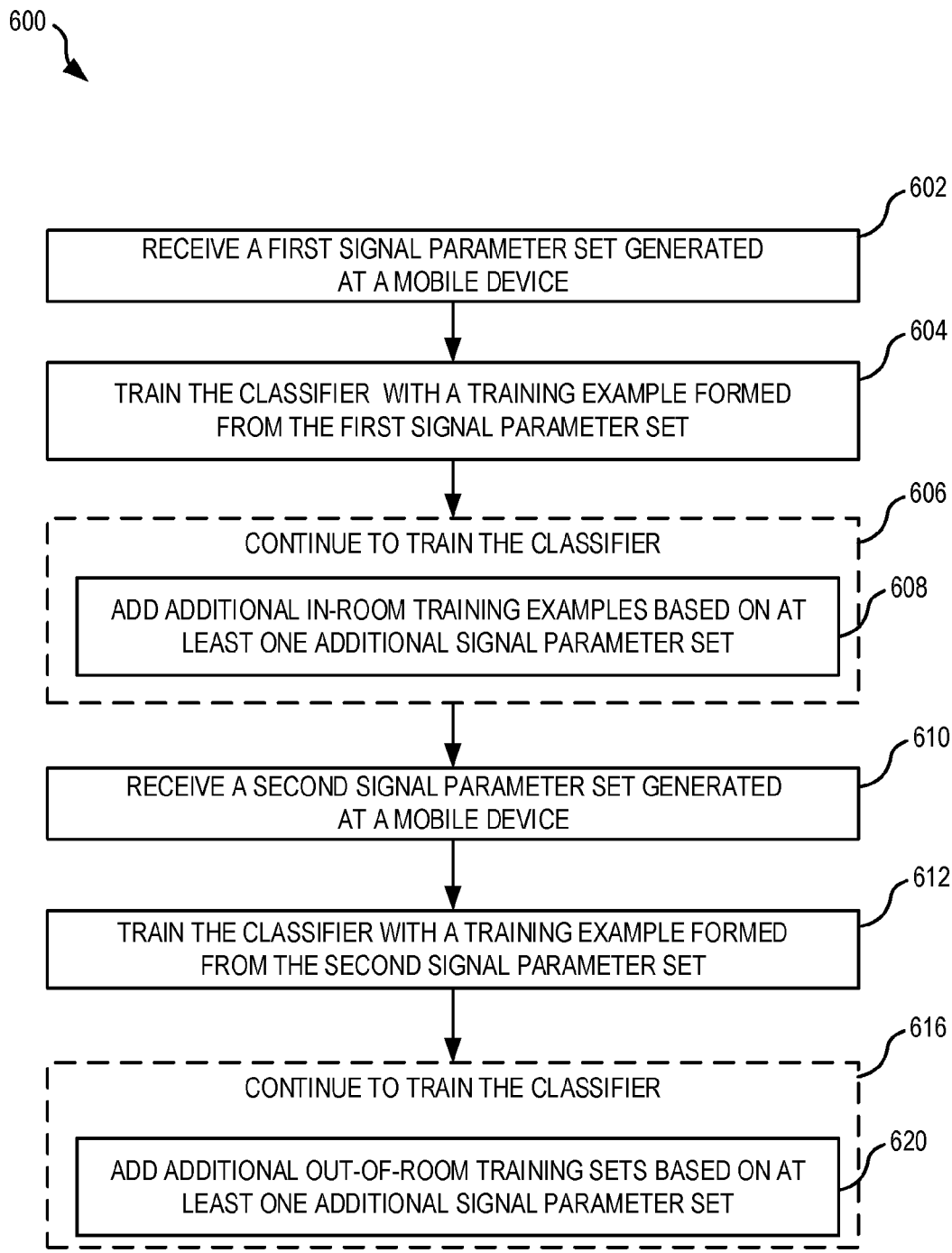
FIG. 6 shows one example of a method that trains a classifier used to determine room occupancy, in embodiments.

FIG. 6 shows one example of a method 600 that trains a classifier used to determine room occupancy. The method 600 may be implemented by the occupancy determiner 200, whether within the mobile device 106 or remotely located therefrom, to train the classifier 250. The method 600, or parts thereof, may represent a supervisory learning algorithm that trains the classifier 250.

At a block 602, the method 600 receives a first signal parameter set generated at a mobile device. In one example of the block 602, the occupancy indicator 200 receives the first signal parameter set 336 from the mobile device 106. At a block 604, the method 600 trains a classifier with a training example formed from the first signal parameter set and a supervisory signal. In one example of the block 606, the occupancy determiner 200 creates a training example by combining the first signal parameter set 336 and the positive occupancy indication 334. The occupancy determiner 200 then trains the classifier 250 with the training example.

In some embodiments, the method 600 includes a block 606 wherein the method 600 continues to train the classifier with training examples formed from additional signal parameter sets. In some of these embodiments, the block 606 has a sub-block 608 wherein the method 600 adds additional in-room training examples from additional signal parameter sets generated when the mobile device was known to be in the room. In one example of the sub-block 608, at least one additional signal parameter set 352 is known to be generated at the mobile device 106 when the mobile device 106 is in the room because it was generated after the occupancy indication 334 was set to TRUE and before the occupancy indication 334 was set to FALSE. In some embodiments of the sub-block 608, at least one additional signal parameter set 352 is known to be generated at the mobile device 106 when the mobile device 106 was in the room because it was generated after the first signal parameter set 336 (or an additional signal parameter set 352 matching the first signal parameter set 336), and before the second signal parameter set 348 (or an additional signal parameter set 352 matching the second signal parameter set 348).

At a block 610, the method 600 receives a second signal parameter set generated at the mobile device. In one example of the block 610, the occupancy indicator 200 receives the second signal parameter set 348 from the mobile device 106. At a block 612, the method 600 trains the classifier with a training example formed from the second signal parameter set and a supervisory signal. In one example of the block 612, the occupancy determiner 200 creates a training example by combining the second signal parameter set 348 and the negative occupancy indication 334. The occupancy determiner 200 then trains the classifier 250 with the training example.

In some embodiments, the method 600 includes a block 616 wherein the method 600 continues to train the classifier with training examples formed from additional signal parameter sets. In some of these embodiments, the block 616 has a sub-block 620 wherein the method 600 adds additional out-of-room training examples from additional signal parameter sets generated when the mobile device was known to be out of the room. In one example of the sub-block 620, at least one additional signal parameter set 352 is known to be generated at the mobile device 106 when the mobile device 106 was out the room because it was generated after the occupancy indication 334 was set to FALSE. In some embodiments of the sub-block 620, at least one additional signal parameter set 352 is known to be generated at the mobile device 106 when the mobile device 106 was out of the room because it was generated after the second signal parameter set 348 (or an additional signal parameter set 352 matching the second signal parameter set 348).

In some embodiments, that method 600 may be used in conjunction with the method 500, such that the additional signal parameter sets received at block 522 of the method 500 are also used to generate additional training examples for training the classifier.

Figure 7:
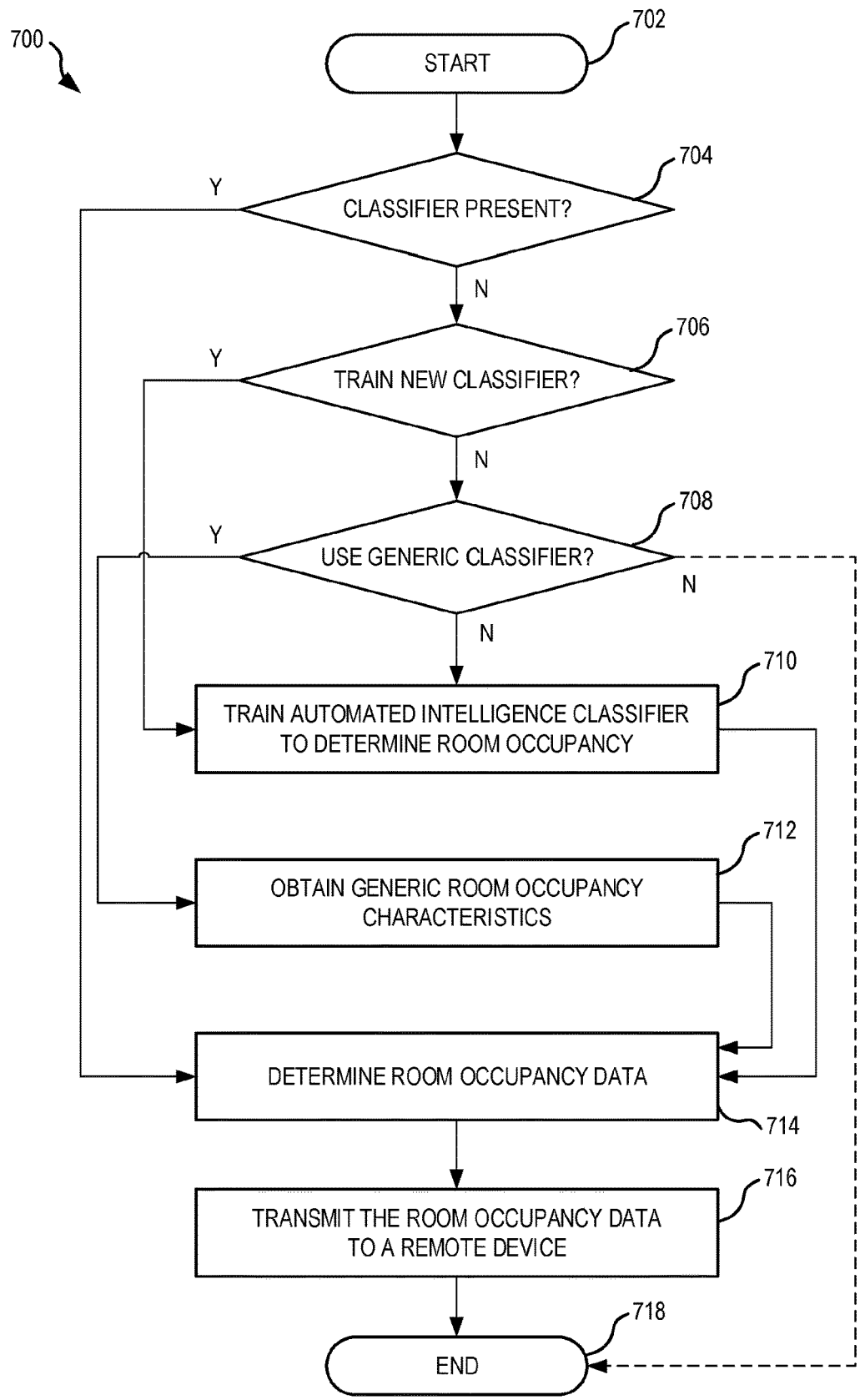
FIG. 7 shows one example of a method that determines occupancy of a mobile device in a room, in embodiments.

FIG. 7 shows one example of a method 700 that determines occupancy of a mobile device in a room. The method 700 may be implemented using one or more components of the occupancy determiners 100 and 200, as described above and shown in FIGS. 1-4. The method 700 begins at a block 702. In one example of operation, the method 700 is triggered upon receipt, at the mobile device 106, of the input ID code 332 into a room-occupancy application running on the mobile device 106.

At a decision block 704, a mobile device determines if a classifier already exists to determine room occupancy of the mobile device. If yes, the method 700 proceeds with a block 714, else the method 700 proceeds with a block 706. In one example of the block 704, the mobile device 106 communicates with the occupancy determiner 200 to determine whether the occupancy determiner 200 previously instantiated (i.e., generated and trained) an already-existing classifier 250 that can be used with wireless-signal characteristics measured by the mobile device 106. The already-existing classifier may be one of several such classifiers stored in the occupancy determiner 200 and used by the occupancy determiner 200 to determine occupancy of multiple mobile devices in the single room. The already-existing classifier may correspond to a type of the mobile device 106 (e.g., make and/or model), wherein the occupancy determiner 200 stores and utilizes one classifier 250 for each type of mobile device. Alternatively, the already-existing classifier may be unique to the mobile device 106, wherein the occupancy determiner 200 stores and utilizes one classifier 250 for each mobile device (either currently and/or previously in the room). Alternatively, the already-existing classifier may be only one classifier 250 used for all mobile devices 106 in the room, regardless of type.

In one example of the block 704, the occupancy determiner 200 is remotely located from the mobile device 106, and the mobile device 106 transmits the mobile device ID 254 to the occupancy determiner 200 via the network 204. The occupancy determiner 200 then compares the mobile device ID 254 to registered classifiers 250 to determine if an already-existing classifier 250 may be used with the mobile device 106. Where the occupancy determiner 200 is integral with the mobile device 106, the mobile device 106 searches the mobile memory 220 to determine if an already-existing classifier 250 has been generated for the given room associated with the input ID code 332.

At the decision block 706, the method 700 determines if a new classifier is to be generated and trained with wireless-signal characteristics from the mobile device. If yes, the method 700 proceeds with a block 710, else the method 700 proceeds with a block 708. In one example of the block 700, a prompt is presented on the interface 214 requesting if the user 222 wants to train a new classifier for the mobile device 106 or the type of the mobile device 106. In another example of the block 706, settings within the occupancy determiner 200 or mobile device 106 are queried to determine if a new classifier is to be trained for the mobile device 106 or the type of the mobile device 106.

At a decision block 708, the method 700 determines if a generic classifier is to be used for the new classifier. If yes, the method 700 proceeds with a block 712, else the method 700 either (1) proceeds with the block 710 to train the generic classifier with the mobile device and register the trained generic classifier with the occupancy determiner 200, or (2) ends at a block 718 without determining occupancy of the mobile device. In one example of the block 708, a prompt is presented on the interface 214 requesting if the user 222 wants to instantiate the new classifier using the generic device occupancy characteristics 360 (e.g., via the server 370 or the occupancy determiner 200) for the type of the mobile device 106. In another example of the block 708, settings within the occupancy determiner 200 or mobile device 106 are queried to determine if the new classifier is to be instantiated with the generic device occupancy characteristics 360.

In a block 710, the method 700 trains an automated intelligence classifier that determines occupancy of the mobile device. The block 710 is implemented using any of the above described systems and methods for generating and/or instantiating any existing classifier 250. For example, the block 710 may be implemented using any one or more steps of the methods 500 and 600 discussed above. Furthermore, in one embodiment the automated intelligence classifier is only trained to predict when the mobile device 106 is in the room, and not when the mobile device 106 is out of the room. In another embodiment, the automated intelligence classifier is trained to predict both when the mobile device 106 is in the room and out of the room.

In the block 712, the method 700 obtains generic device occupancy characteristics for the type of the mobile device. In one example of the block 712, the mobile the occupancy determiner 200 downloads the generic device occupancy characteristics 360 (e.g., from the server 370 via the network 204) that match one or more of the brand, model, and operating system of the mobile device 106. In another example of the block 710, the mobile device 106 downloads the generic device occupancy characteristics 360, from the occupancy determiner 200 via network 204, that match one or more of the brand, model, and operating system of the mobile device 106.

In the block 714, the method 700 determines room occupancy data of the room, including the mobile device, using one of (1) the already-existing classifier identified in the block 704, (2) the new generic classifier generated in the block 706, and (3) the automated intelligence classifier trained in the block 710. In one example of the block 714, a signal parameter set (e.g., the first signal parameter set 336, second signal parameter set 348, and/or additional signal parameter set 352) is generated by the signal analyzer 226 of the mobile device 106, and transmitted to the occupancy determiner 200. The occupancy determiner 200 inputs this signal parameter set to the corresponding classifier 250 to generate the occupancy data 240 for the mobile device 106. Where the occupancy determiner 200 is located remotely from the mobile device 106, the signal parameter set is transmitted from the mobile device 106 to the occupancy determiner 200 via the network 204 prior to generating the occupancy data 240.

In a block 716, the room occupancy data is transmitted to a remote device. In one example of the block 716, the occupancy determiner 200 transmits the room occupancy data 240 to one or more of the server 370, a third-party server (such as a building occupancy management server), the display device 330, and another device. If the occupancy determiner 200 is integral with the mobile device 106, then the occupancy data 240 is transmitted from the mobile device 106 to one or more of the server 370, a third-party server (such as a building occupancy management server), the display device 330, and another device via the network 104. In another example of the block 716, when the mobile device 106 transmits occupancy data 240 to, for example, the display device 330, the mobile device 106 automatically connects to the display device 330 (or another device, such as the Solstice Pod manufactured by Mersive Technologies, Inc.) to allow the mobile device 106 to interact with the device 330.

At the block 718, the method 700 ends. The method 700 may repeat, either periodically or aperiodically (e.g., when the data associated with the method 700 changes), to update the occupancy data of the room in real-time. Furthermore, the method 700 may be performed on a plurality of devices such that for any given room the occupancy of that room is known automatically.

Figure 8:
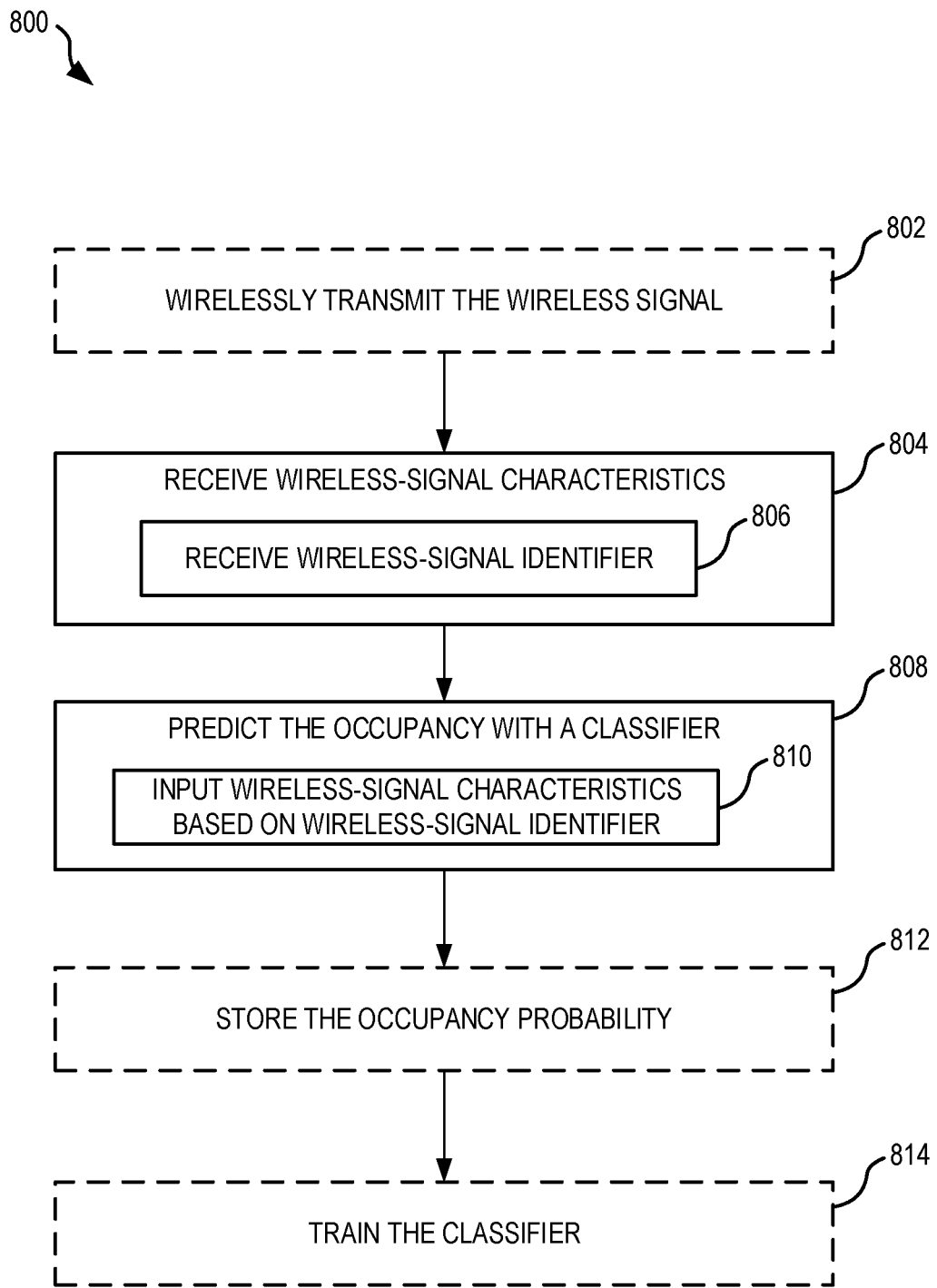
FIG. 8 shows one example of a method that determines occupancy of a mobile device in a room, in embodiments.

FIG. 8 shows one example of a method 800 that determines occupancy of a mobile device in a room. The method 800 may be implemented using one or more components of the occupancy determiners 100 and 200, as described above and shown in FIGS. 1-4.

In a block 804, the method 800 receives wireless-signal characteristics measured by the mobile device from a wireless signal. In one example of block 804, the mobile device 106 transmits the first signal parameter set 336 to the occupancy determiner 200 via the network 204. In one embodiment, the block 804 includes a sub-block 806, wherein the method 800 receives a wireless-signal identifier of the wireless signal detected by the mobile device, the wireless-signal identifier uniquely identifying the wireless signal. In one example of the sub-block 806, the mobile device 106 transmits the mobile device ID 254 to the occupancy determiner 200 via the network 204.

In a block 808, the method 800 predicts the occupancy of the mobile device in the room by using a classifier to calculate an occupancy probability from the received wireless-signal characteristics. In one example of block 808, the occupancy determiner 200 calculates the occupancy probability 256 from the wireless-signal characteristics 236 measured by the mobile device 106. In one embodiment, the block 808 includes a sub-block 810, wherein the method 800 inputs the wireless-signal characteristics to the classifier based on the wireless-signal identifier. In one example of the sub-block 810, the feature-vector generator 262 forms the feature vector 258 from the wireless-signal characteristics 236, wherein the occupancy determiner 200 inputs the feature vector 258 to the classifier 250.

In some embodiments, the method 800 includes a block 812, wherein the method 800 stores the occupancy probability. In one of these embodiments, the method 800 receives a mobile device ID from the mobile device, and stores the mobile device ID with the occupancy probability of the mobile device. In one example of the block 812, the occupancy determiner 200 receives the mobile device ID 254 from the mobile device 106, and stores the occupancy probability 256 with the mobile device ID 254 in the occupancy data 240.

In other embodiments, the method 800 includes a block 814, where the method 800 trains the classifier with a training example formed from an occupancy indication and the received wireless-signal characteristics. The occupancy indication may be a positive occupancy indication verifying that the mobile device was in the room when the mobile device measured the at least one wireless signal, or a negative occupancy indication verifying that the mobile device was out of the room when the mobile device measured the at least one wireless signal. In one example of the block 814, the occupancy determiner 200 forms a training example by combining the received occupancy indication 334 with one of the first signal parameter set 336, the second signal parameter set 348, and the additional signal parameter set 352. The occupancy determiner 200 then trains the classifier 250 with the training example.

In other embodiments, the method 800 includes a block 802, wherein the method 800 wirelessly transmitting the wireless signal measured by the mobile device. In one example of the block 802, the occupancy determiner 200 transmits a wireless signal 124(5) that is measured by the mobile device 106 to obtain wireless-signal characteristics.

Pre-Clustering and Geolocation Selection

To determine occupancy of one or more mobile devices in a plurality of rooms, a plurality of binary classifiers may be used, with at least one binary classifier for each specific room. Alternatively, a single multinomial classifier may be used to determine occupancy for all the rooms. The difference between these two these implementations of the classifiers has significant merits in terms of scalability and retraining of ANNs having a high degree of variability. In situations where an emitter is moved, removed, or new devices/locations are added, a single multinomial classifier would constantly require updating, rescaling, and/or retraining. Moreover, the overall size and computational complexity of a set of multiple binary classifiers is proportional to the sum of the number of elements in each of the binary classifiers (e.g., the number of input nodes of each ANN), whereas a multinomial classifier scales with the product of the number of elements in each classifier. Finally, multiple binary classifiers offer processing optimizations over a single multinomial classifier whereby several binary classifiers can be trained or classified simultaneously using computer systems with multiple processors and/or threads.

Regardless of classifier implementation, computing performance and scalability may become problematic when many (e.g., thousands) devices/locations need to be learned. This is often the case for big organizations with distributed resources over multiple campuses in various geographical regions. In these cases, the sheer number of binary classifiers can become cumbersome and unwieldly to manage, train, and utilize. Fortunately, a large set of binary classifiers may be grouped into classifier-clusters that are themselves more amenable to the overarching performance requirements. When a particular binary classifier is needed (e.g., for classification or training), the appropriate cluster is first identified, and then only the binary classifiers contained therein need be considered.

In one embodiment, binary classifiers are grouped into classifier-clusters using measured locations of the corresponding rooms. The location of the rooms may be obtained, for example, via GPS or proximity to a network access point whose source position is known. Several binary classifiers may then be grouped into one classifier-cluster when they are similarly located (e.g., within the same building). In another embodiment, a trained multinomial classifier (e.g., a decision tree, k-means, k-nearest, neural network, etc.) receives a feature vector and outputs the cluster contains the corresponding binary classifier. Such a system could be further automated by utilizing auto-clustering, wherein the clusters themselves are programmatically rebalanced (i.e., the binary classifiers are moved between clusters) as various locations are added, moved, removed.

Hashing

Classifiers receive an input feature vector (e.g., see feature vector 258 in FIG. 2) whose individual elements represent different quantities that are to be learned by the classifier. These elements may be thought of as orthogonal axes in a high-dimensional space where, for example, the first element represents a signal strength of a first emitter, the second element represents a signal strength of a second emitter, and so on. While this simple mapping between wireless-signal characteristics and feature-vector elements works well for many applications (e.g., image processing, regression, etc.) the nature of the environment and signal measured for device/location classification make this approach unacceptable. From one signal-scan (e.g., as implemented by the wireless-signal detector 248 of FIG. 2) to the next there may be fewer or more emitters and their relative order may be very different.

While the simple mapping may mitigate this problem to some extent, it requires a priori knowledge of the entire set of possible emitters that may be measured in a given room. The sudden introduction of a new emitter necessitates a completely restructuring and retraining of any/all classifiers that may process the given feature vector. Being that the many of the wireless signals (e.g., Wi-Fi, Bluetooth, BLE, etc.) are often emitted by mobile devices that come and go from a room, the chances of transient signals being detected is very high. Furthermore, antenna directionality causes wireless signals to be readily seen and dropped as the user's location/orientation changes even slightly.

In one embodiment, a feature vector is constructed by reserving a large number (approximately two orders-of-magnitude more than the number of expected emitters) of elements. For a given emitter, the hash (md5, Shaa1, etc.) of its wireless-signal UID may be computed and modulated by the length (i.e., remainder) of the feature vector. This yields a repeatable and generally unique index of the feature vector where the emitter's corresponding wireless-signal characteristics may be entered sequentially. Further, with such a large feature vector, the chances of hash collisions among different emitters is diminished (specifically, the "Birthday Problem" can be considered and the precise probability of collision computed). Finally, as transient emitters come and go, their presence in the feature vector likely does not collide with fixed/stable emitters but rather the corresponding indices are just learned as noise/unimportant by the classifier.

In other embodiments, hashing is implemented based on the types of wireless signals (e.g., Wi-Fi, BLE, cellular, etc.). This is equivalent to forming several sub-feature vectors, one for each signal type, and concatenating the sub-feature vectors together to form a single final feature vector. Furthermore, some very stable and/or reliable wireless signals (e.g., Wi-Fi Access Point, beacons, etc.) may be "registered" with the classifiers, corresponding elements of the feature vector reserved therefore. In this way, prominent emitters will be guaranteed to never collide with transient sources. In one embodiment, the "reserved" emitters are dynamically learned and set without administrator configuration/interaction.

Location-Aware Learning

In one embodiment, each classifier is retrained with an entire set of previously-collected training examples combined with a new training example. Various permutations of back propagation may be performed with these training examples. Additionally, a metric (e.g., sample collection time, mean difference between elements of a feature vector and an average feature vector, etc.) may be use to select a subset of previously-collected past training samples.

In another embodiment, classifiers are one-step trained, i.e., trained using only the new training example. As new training examples become available, one or more steps of back propagation are performed. This approach has several benefits, including: (1) training examples need not be stored, sorted, or otherwise managed for use in future training, (2) evolving signatures (e.g., fixed emitters being added/moved/removed) can be automatically handled as the classifier adapts to a changing cost-function minimum, and (3) it is generally faster and far more efficient to run a few rounds of backpropagation than to retrain a classifier with an entire set of training examples.

When retraining or backpropagating with a training set of past and/or current training examples, it may be desirable to scale and/or normalize the numbers of positive and negative samples within the training set. Particularly in cases where the number of classifiers is large, a training set may become excessively uneven, i.e., there may be more significantly more negative samples than positive samples. This imbalance is a consequence of the fact that if N locations are trained with one training example collected in each location, then for any given location there will be only one positive training example but (N−1) negative training examples. In one embodiment, normalization of the training set may be accomplished by modifying the step-length used during back propagation, and scaling by a multiple of 1 for a positive case or by 1/(N−1) for negative cases. In another embodiment, the training set may be normalized by simply duplicating test cases; negative cases are not duplicated, but positive samples are duplicated by a factor of (N−1).

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system that determines occupancy of a mobile device in a room, comprising:
   a processor;
   a memory communicatively coupled with the processor;
   a classifier implemented as machine-readable instructions stored in the memory and configured to control the processor to calculate an occupancy probability from one or more wireless-signal characteristics measured by a mobile device from a wireless signal wherein the classifier is trained by:
      receiving from the mobile device (i) a room identification code inputted to the mobile device, and (ii) a first signal parameter set of at least one wireless signal measured by the mobile device upon entering the room identification code; and
      training the classifier with the first signal parameter set and a positive occupancy indication when the received room identification code matches a unique identification code assigned to the room; and
   machine-readable instructions stored in the memory and configured to control the processor to:
      receive the wireless-signal characteristics from the mobile device, and
      predict the occupancy of the mobile device in the room by using the classifier to calculate the occupancy probability from the received wireless-signal characteristics.

2. The system of claim 1, the wireless-signal characteristics including at least one of: an average power of the wireless signal, one or more Fourier coefficients of a spectrum of the wireless signal, and one or more ratios of Fourier coefficients of the spectrum of the wireless signal.

3. The system of claim 2, the classifier being an artificial neural network.

4. The system of claim 2, wherein:
   the memory stores additional machine-readable instructions that control the processor to receive a wireless-signal identifier of the wireless signal detected by the mobile device, the wireless-signal identifier uniquely identifying the wireless signal; and the machine-readable instructions that control the processor to predict the occupancy of the mobile device include machine-readable instructions that control the processor to:
input the wireless-signal characteristics to the classifier based on the wireless-signal identifier, and
use the classifier to calculate the occupancy probability from the inputted wireless-signal characteristics.

5. The system of claim 4, wherein:
the classifier is an artificial neural network (ANN) having a plurality of input nodes;
the system further comprises a hash function implemented as machine-readable instructions stored in the memory and configured to control the processor to calculate an offset-node of the ANN from the wireless-signal identifier; and
the machine-readable instructions that control the processor to input the wireless-signal characteristics to the classifier based on the wireless-signal identifier includes machine-readable instructions that control the processor to:
use the hash function to calculate the offset-node of the ANN from the wireless-signal identifier, and
input the wireless-signal characteristics to the ANN starting at the offset-node of the plurality of input nodes.

6. The system of claim 5, further comprising machine-readable instructions that control the processor to:
receive from the mobile device a mobile identifier that uniquely identifies the mobile device; and
store the occupancy probability with the mobile identifier in the memory.

7. The system of claim 1, the wireless signal originating from outside the room.

8. The system of claim 1, the wireless signal originating from inside the room.

9. The system of claim 1, further comprising a transceiver communicatively coupled with the memory and the processor to receive the wireless-signal characteristics from the mobile device.

10. The system of claim 9, the transceiver being a wired transceiver configured to receive the wireless-signal characteristics via wired communication.

11. The system of claim 9, the transceiver being a wireless transceiver configured to receive the wireless-signal characteristics via wireless communication wherein the wireless signal measured by the mobile device is wirelessly transmitted by the transceiver.

12. The system of claim 1, further comprising a display configured to display the unique identification code in the room.

13. The system of claim 12, the classifier is implemented in an occupancy determiner integral to the display.

14. The system of claim 1, the classifier is implemented in an occupancy determiner integral within the mobile device.

15. The system of claim 12, the occupancy determiner being further configured to wirelessly transmit the unique identification code to the mobile device upon entering the room.

16. The system of claim 12, the occupancy determiner being further configured to:
receive from the mobile device an additional signal parameter set of at least wireless signal measured with the mobile device, and
train the classifier with the additional signal parameter set and the positive occupancy indication when the additional signal parameter set matches the first signal parameter set.

17. The system of claim 16, the occupancy determiner being further configured to:
receive from the mobile device (i) a disconnect notification entered to the mobile device, and (ii) a second signal parameter set of at least one wireless signal measured by the mobile device after the disconnect notification was entered to the mobile device, and
train the classifier with the second signal parameter set and a negative occupancy indication.

18. A method that determines occupancy of a mobile device in a room, comprising:
receiving wireless-signal characteristics measured by the mobile device from a wireless signal; and
predicting the occupancy of the mobile device in the room by using a classifier to calculate an occupancy probability from the received wireless-signal characteristics wherein the classifier is trained by:
receiving from the mobile device (i) a room identification code inputted to the mobile device, and (ii) a first signal parameter set of at least one wireless signal measured by the mobile device upon entering the room identification code; and
training the classifier with the first signal parameter set and a positive occupancy indication when the received room identification code matches a unique identification code assigned to the room.

19. The method of claim 18,
further comprising receiving a wireless-signal identifier of the wireless signal detected by the mobile device, the wireless-signal identifier uniquely identifying the wireless signal;
wherein predicting the occupancy of the mobile device includes:
inputting the wireless-signal characteristics to the classifier based on the wireless-signal identifier, and
using the classifier to calculate the occupancy probability from the inputted wireless-signal characteristics.

20. The method of claim 19,
wherein the classifier is an artificial neural network (ANN) having a plurality of input nodes; and
inputting the wireless-signal characteristics includes:
using a hash function to calculate an offset-node of the ANN from the wireless-signal identifier, and
inputting the wireless-signal characteristics to the ANN starting at the offset-node of the plurality of input nodes.

21. The method of claim 20, further comprising:
receiving from the mobile device a mobile identifier that uniquely identifies the mobile device; and
storing the occupancy probability with the mobile identifier.

22. The method of claim 18, further comprising training the classifier with a training example formed from an occupancy indication and the received wireless-signal characteristics.

23. They system of claim 22, the occupancy indication being one of: (i) a positive occupancy indication verifying that the mobile device was in the room when the mobile device measured the at least one wireless signal, and (ii) a negative occupancy indication verifying that the mobile device was out of the room when the mobile device measured the at least one wireless signal.

24. The method of claim 23, further comprising:
receiving from the mobile device a mobile identifier that uniquely identifies the mobile device; and
storing the occupancy indication with the mobile identifier.

25. The method of claim 23, further comprising receiving the occupancy indication from the mobile device.

26. The method of claim 23, further comprising:
receiving a code inputted to the mobile device when the mobile device measured the wireless signal in the room; and
generating a positive occupancy indication when the inputted code matches an identification code.

27. The method of claim 26, further comprising generating the negative occupancy indication when the inputted code does not match the identification.

28. A method that determines occupancy of a mobile device in a room, comprising:
receiving from the mobile device (i) a room identification code inputted to the mobile device, and (ii) a first signal parameter set of at least one wireless signal measured by the mobile device upon entering the room; and
training a classifier with the first signal parameter set and a positive occupancy indication when the received room identification code matches a unique identification code assigned to the room.

29. The method of claim 28, further comprising wirelessly transmitting the unique identification code to the mobile device upon entering the room.

30. The method of claim 28, further comprising:
receiving from the mobile device an additional signal parameter set of at least one wireless signal measured with the mobile device, and
training the classifier with the additional signal parameter set and the positive occupancy indication when the additional signal parameter set matches the first signal parameter set.

31. The method of claim 30, further comprising:
receiving from the mobile device (i) a disconnect notification entered to the mobile device, and (ii) a second signal parameter set of at least one wireless signal measured by the mobile device after the disconnect notification was entered to the mobile device, and
training the classifier with the second signal parameter set and a negative occupancy indication.

32. The method of claim 31, further comprising training the classifier with the additional signal parameter set and the negative occupancy indication when the additional signal parameter set matches the second signal parameter set.

* * * * *